United States Patent [19]

Sumi et al.

[11] Patent Number: 4,806,813
[45] Date of Patent: Feb. 21, 1989

[54] MOTOR

[75] Inventors: Akiyasu Sumi, Kanagawa; Shigeru Yoshida, Saitama; Akira Kurosawa, Saitama; Tohru Takahashi, Saitama; Yoshitaka Kondoh; Tatsuo Chigira, both of Kanagawa, all of Japan

[73] Assignees: Canon Kabushiki Kaisha, Tokyo; Canon Denshi Kabushiki Kaisha, Saitama, both of Japan

[21] Appl. No.: 27,173

[22] Filed: Mar. 17, 1987

[30] Foreign Application Priority Data

| Mar. 20, 1986 | [JP] | Japan | 61-063460 |
| Apr. 17, 1986 | [JP] | Japan | 61-088613 |
| Apr. 17, 1986 | [JP] | Japan | 61-088614 |
| Apr. 17, 1986 | [JP] | Japan | 61-088615 |
| Jun. 30, 1986 | [JP] | Japan | 61-152963 |
| Jun. 30, 1986 | [JP] | Japan | 61-152964 |
| Dec. 27, 1986 | [JP] | Japan | 61-203286[U] |
| Dec. 27, 1986 | [JP] | Japan | 61-203287[U] |
| Jan. 14, 1987 | [JP] | Japan | 62-004269[U] |

[51] Int. Cl.$^4$ .............................. H02K 1/12
[52] U.S. Cl. ....................... 310/254; 310/68 R; 310/156; 310/184; 310/DIG. 6; 318/254; 324/208
[58] Field of Search .............. 310/254, 256, 162, 90, 310/49 R, 163, 156, 68 R, 68 B, 68 C, DIG. 6, 180, 184, 208, 40 MM; 318/254; 324/208

[56] References Cited

U.S. PATENT DOCUMENTS

| 3,687,042 | 8/1972 | Mizui et al. | 354/234.1 |
| 4,099,104 | 7/1978 | Muller | 318/254 |
| 4,113,359 | 9/1978 | Koike et al. | 350/269 |
| 4,152,060 | 5/1979 | Specht . | |
| 4,242,608 | 12/1980 | Ishigaki | 310/68 B |
| 4,274,026 | 6/1981 | Haydon | 310/49 R |
| 4,327,977 | 5/1982 | Starp | 354/440 |
| 4,394,594 | 7/1983 | Schmider | 310/68 R |
| 4,456,356 | 6/1984 | Okabe . | |
| 4,534,624 | 8/1985 | Toda et al. | 350/429 |
| 4,574,211 | 3/1986 | Muller | 310/68 R |
| 4,620,139 | 10/1986 | Egami | 310/68 R |
| 4,629,924 | 12/1986 | Grosjean | 310/49 R |
| 4,668,884 | 5/1987 | Amao | 310/68 R |

FOREIGN PATENT DOCUMENTS

| 58-77310 | 5/1983 | Japan . |
| 59-128609 | 8/1984 | Japan . |
| 18423 | 9/1985 | Japan . |
| 141682 | 9/1985 | Japan . |

Primary Examiner—R. Skudy
Attorney, Agent, or Firm—Fitzpatrick, Cella, Harper & Scinto

[57] ABSTRACT

A motor comprises a rotor made of a permanent magnet and pairs of yokes having pairs of magnetic pole parts arranged round the circumference of the rotor. The rotor is arranged to be pivotally carried by a bearing part disposed at one end of the yoke. A position detecting element which detects the magnetic pole position of the rotor is carried by the yoke. An exciting coil is wound round each pair of the yokes.

3 Claims, 31 Drawing Sheets

F I G. 9B
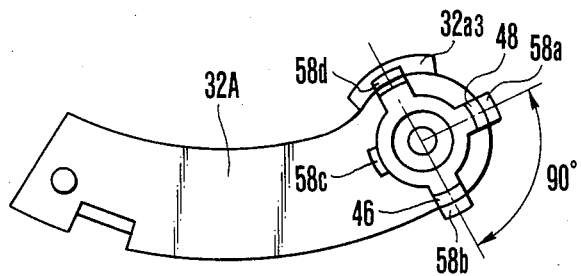
F I G. 9C
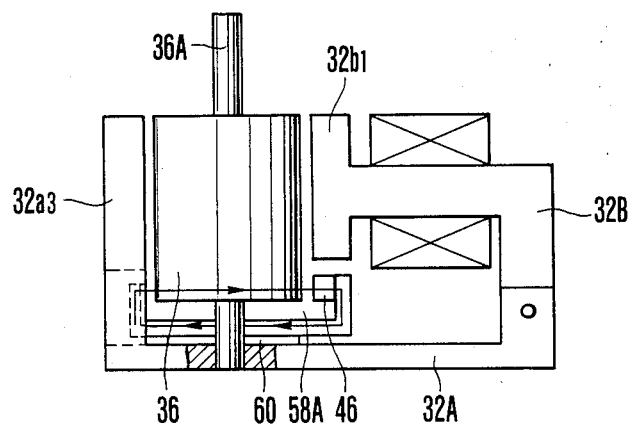
F I G. 9D
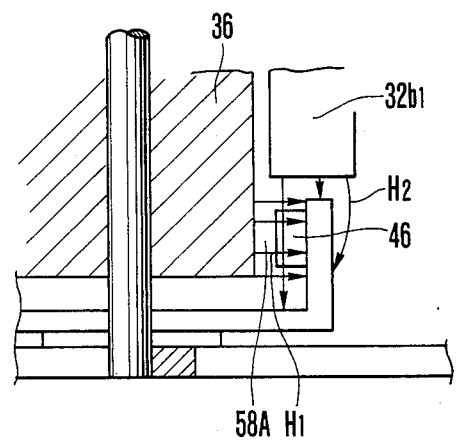

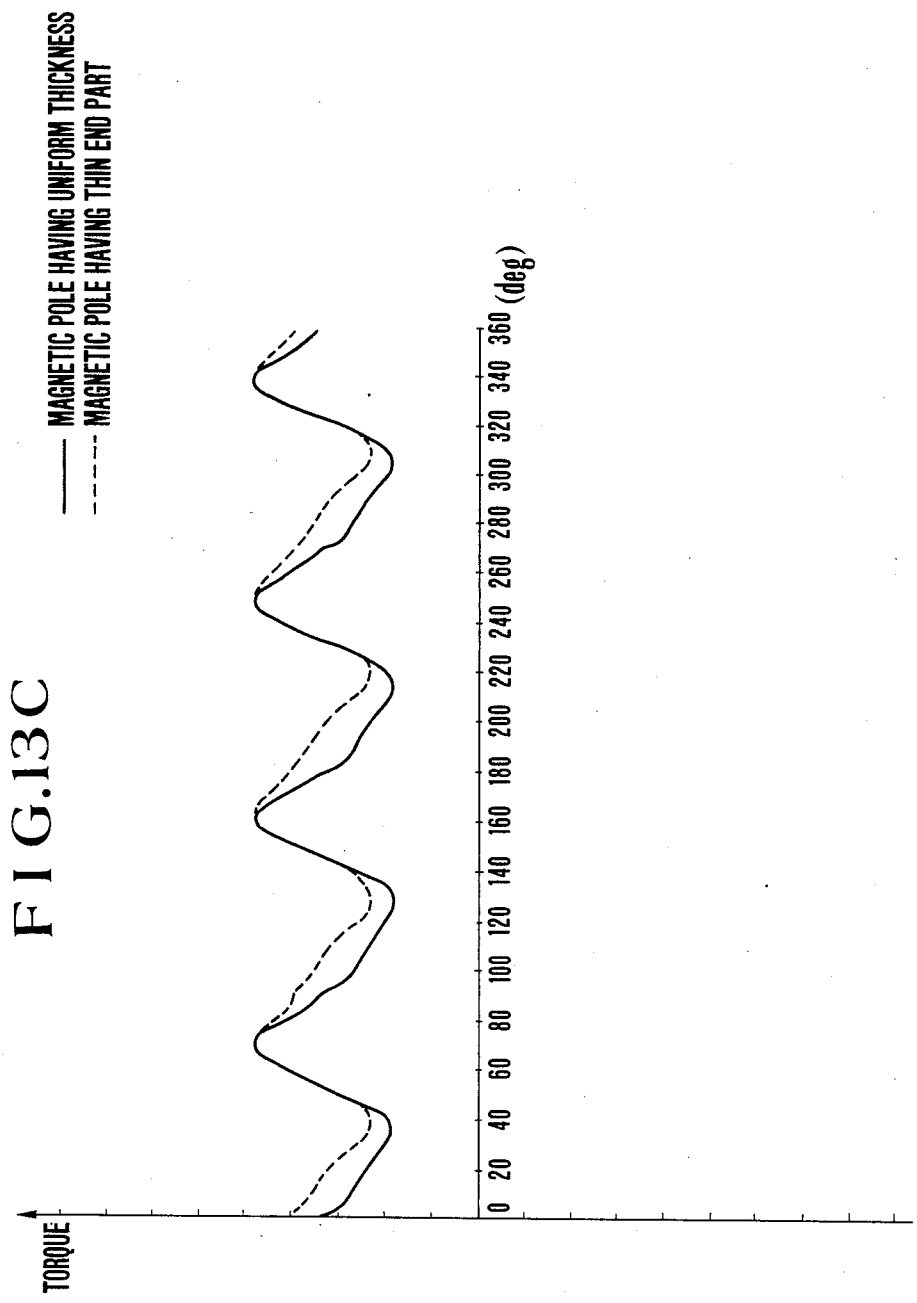

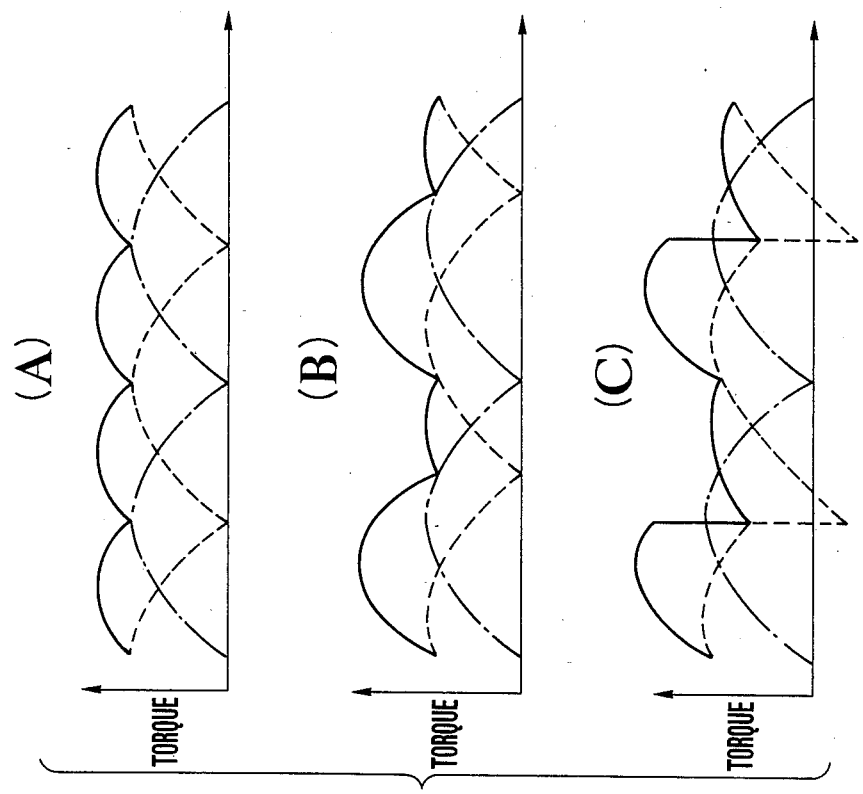
F I G. 16D

MOTOR

BACKGROUND OF THE INVENTION

1. Field of the Invention:

This invention relates to a motor and more particularly to a motor of the kind receiving power supply to its exciting coils under change-over control which is performed by detecting, with a position detecting element such as a Hall element or the like, the magnetic pole position of a rotor consisting of a permanent magnet. The invention further relates to the shape of the motor which is oblongly formed as a whole by arranging a pair of yokes which carry the exciting coils, with the rotating shaft of the rotor centered in between them, to be opposed to each other across the rotation shaft either in a line or in an angle somewhat narrower then 180 degrees.

2. Description of the Related Art:

The applications of the motors of the kind related to this invention include the drive source of an imaging apparatus such as a camera. Description of the prior art related to the motor of an imaging apparatus which is disposed within a lens barrel and arranged to shift an optical member such as a lens is as follows: Within the lens barrel, the blades of a stop device, a focusing lens, a zooming lens, etc. are arranged to be moved by the driving force of the motor. The known literature pertaining to stop blade and lens driving devices includes, among others, the following:

U.S. Pat. Nos. 3,687,042; 4,113,359, 4,152,060, 4,534,624 and 4,456,356.

The motors disclosed by these patents of the U.S.A. can be divided into two types including one type in which a pencil shaped cylindrical motor is disposed in a void space within a lens barrel and the other in which a hollow, cylindrical motor is disposed within a lens barrel. The pencil type motor which is disclosed, for example, in U.S. Pat. No. 4,456,356 necessitates some contrivance to reshape the lens barrel for obtaining the void space in which the motor can be disposed and for elimination of protrudent parts in the space. Meanwhile, the hollow cylindrical motor which is arranged, for example, as disclosed in U.S. Pat. No. 4,534,624 excessively increases the size and weight of the lens barrel.

The conventional motor used as above stated has been arranged in varied kinds according to the parts to be driven within the imaging apparatus, such as the camera body and the lens barrel of a camera using a silver-halide film, a floppy disc of an electronic camera (or still video) using a magnetic film.

SUMMARY OF THE INVENTION

It is a general object of this invention to provide a motor suitably arranged for installation within a camera body or a lens barrel for the purpose of driving stop blades, a lens, etc.

It is a more specific object of this invention to provide a motor which is highly suited for an apparatus having such a device as a lens barrel which is in a cylindrical shape as a whole having a lens group located in the middle part thereof and tubular members such as a lens moving helicoid tube, a cam tube and other lens barrel members laminated in the peripheral space outside of the optical path of the lens and must have the motor disposed within the inner and outer spaces of a tubular member.

It is another object of this invention to provide a motor which is arranged to be easily positioned within a small space available within a lens barrel or the like, the arrangement of the motor comprising a rotor which is made of a permanent magnet; a plurality of pairs of yokes which are arranged across the rotor at an angle of about 180 degrees to each other and are provided with a plurality of pairs of magnetic pole parts extending along the circumferential surface of the rotor with exciting coils wound round the yokes; and a detecting element which is arranged to detect the position of the magnetic pole of the rotor with an improved degree of accuracy.

It is a further object of this invention to provide a motor which is arranged to permit adjustment of positional relation among the parts thereof to ensure an improved degree of precision of the positional relation, for example, between the rotor and the stators thereof.

It is a further object of this invention to provide a motor having adjustment means which is capable of accurately adjusting an air gap between the rotor and the stators of the motor.

Further, in the motor of the above stated kind, uneven spacing intervals between adjacent stators results in an error in the stopping position of the motor as the number of stably stoppable points decreases due to a cogging torque. The use of such a motor in shifting a focusing lens for bringing it to an in-focus position increases a minimum control width as reduced to an image plane. Then, under such a condition, it often becomes impossible to bring the lens to a stop at a predetermined position by an automatic focusing operation.

It is therefore a further object of the invention to provide a stator carrying arrangement for a motor which permits adjacent stators accurately and evenly spaced by lessening the minimum control width of the step angle of the motor, so that the lens can be brought to a stop at a precise position and the motor can be smoothly rotated with reduced torque ripples.

These and further objects and features of this invention will become apparent from the following detailed description of embodiments thereof taken in connection with the accompanying drawings.

BRIEF DESCRIPTION OF THE DRAWINGS

FIGS. 9A to 9F and 10A to 10D show by way of example a motor having a closed loop magnetic circuit. Of these drawings, FIG. 9A is an exploded view showing the essential parts of a motor having a holder 58. FIGS. 9B, 9C and 9D show a magnetic circuit. FIGS. 9E and 9F are an exploded view and a schematic view showing the essential parts of a motor having a printed circuit board 54. FIGS. 10A and 10D are exploded views showing the essential parts of a motor having a yoke member 32A in place of a holder. FIGS. 10B and 10C show a magnetic circuit.

FIGS. 13A to 13C show by way of example a motor having the arcuate parts of the magnetic pole parts arranged in a thin shape, FIG. 13A schematically showing it, FIG. 13B showing the essential parts of the motor in an exploded view and FIG. 13C explaining an torque output.

FIG. 15C is an exploded oblique view of the motor having the stator carrying arrangement according to this invention.

FIGS. 16A to 16D show another method for adjusting the stators, FIG. 16A showing in a partly sectional plan view a motor having the stator carrying arrangement, FIG. 16B showing the same motor in an exploded oblique view, FIG. 16C showing in an oblique view a stator guide included in FIG. 16A and FIG. 16D showing in graphs torque characteristics which obtain when variations take place in the circumferential position (phase difference) of the stators.

DETAILED DESCRIPTION OF THR PREFERRED EMBODIMENTS

Figure 1:
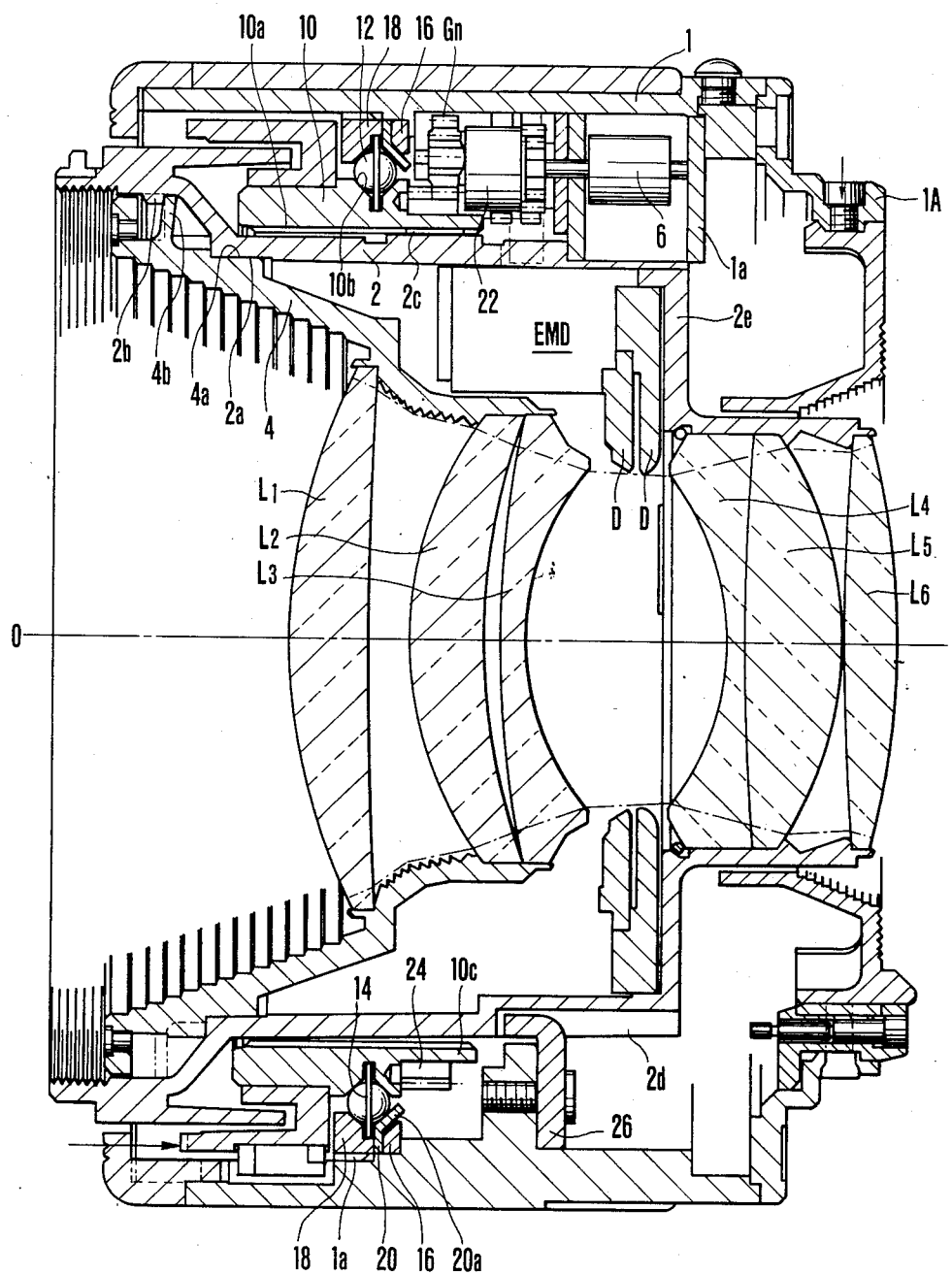
FIG. 1 is a sectional view showing a lens barrel incorporating therein a motor arranged according to this invention.

A lens barrel using a motor according to this invention is arranged as shown in FIG. 1. A fixed tube 1 has a bayonet mount 1A mounted on one end thereof on the side of a camera body which is not shown. First and second shifting rings 2 and 4 are arranged to respectively carry lens groups L4 to L6 and L1 to L3. On the outer circumferential surface are provided fitting engagement part 4a for fitting engagement with the inner diametral part 2a of the first shifting ring 2 and fixing means for fixing the second shifting ring 4 to the shifting ring 2. The fixing means is arranged to engage a plurality of projections 4b with engaging parts 2b which are provided on the inner diametral face of the first shifting ring 2.

A motor 6 which relates to this invention is carried by the fixed tube 1 and is secured to the fixed tube 1 or some other structural member of the lens barrel. A gear group Gn forms a gear device for adjusting a number of revolution in association with a rotation shaft of the motor 6.

A rotary ring 10 is arranged to rotate at a fixed position relative to the fixed tube 1. Along the inner side of the rotary ring 10 is provided a helicoid part 10a which is in screwed engagement with a helicoid part 2c provided on the outer circumferential side of the first shifting ring 2. A ball race 10b is formed in the outer side of the rotary ring 10 in a V sectional shape arranged to receive bearing balls 12.

In the ball race 10b of the rotary ring 10, the bearing balls 12 are continuously arranged through ball spacers 14 or spaced by the ball spacers at fixed intervals. The balls 12 are retained in place in between a first ball receiving ring 16 which is fitted into the inner circumferential face of the fixed tube 1 with a slanting face formed at one end thereof and a second ball receiving ring 18 which is in screwed engagement with a screw part 1a provided on the inner side of the tube 1.

A spacer plate 20 is carried by the first and second ball receiving rings 16 and 18 and has its free end bent along the slanting face of the first ball receiving ring 16. The bent part 20a of the spacer plate 20 is thus arranged to adjust the pushing pressure of the balls 12. A position detector 22 which is an encoder or the like is arranged within the above stated gear device.

A portion of the outer circumference of the rotary ring 10 is arranged to have a smaller diameter than the rest. The small diameter part 10c of the ring 10 has a gear ring 24 secured to the outer circumferential side thereof. The gear ring 24 is arranged to engage the output gear of the above stated gear group Gn.

A space is provided between the shifting ring 2 and the fixed tube 1 for accommodating the gear group Gn. This space is kept jointly by the bearing forming members 10, 16 and 18 of the balls 12 fixedly disposed in between the fixed tube and the shifting ring 2.

A stop unit D is secured to the wall 2e of the small diameter part and the inner circumferential face of the shifting ring 2. A motor EMD is secured to the inner circumferential side of the shifting ring 2 and is arranged to drive the stop unit D.

This lens barrel is mounted on a camera which is not shown. A focusing control means which is disposed on the side of the camera is arranged to cause a motor driving circuit to drive the motor 6. The rotating force of the motor 6 is transmitted to the rotary ring 10 via the gear device Gn. The rotary ring 10 is then caused to rotate in its fixed position by the bearing means. The rotation of the rotary ring 10 is transmitted to the shifting ring 2 which is helicoidally connected to the ring 10. The shifting ring 2 is provided with a straight key way 2d which is arranged on its outer circumferential side to engage a key member 26 which extends from the fixed tube 1. With the rotation of the ring 10 transmitted, therefore, the shifting rings 2 and 4 move the lenses L1 to L6 according as they move straight in parallel to the optical axis O of these lenses.

Figure 2A:
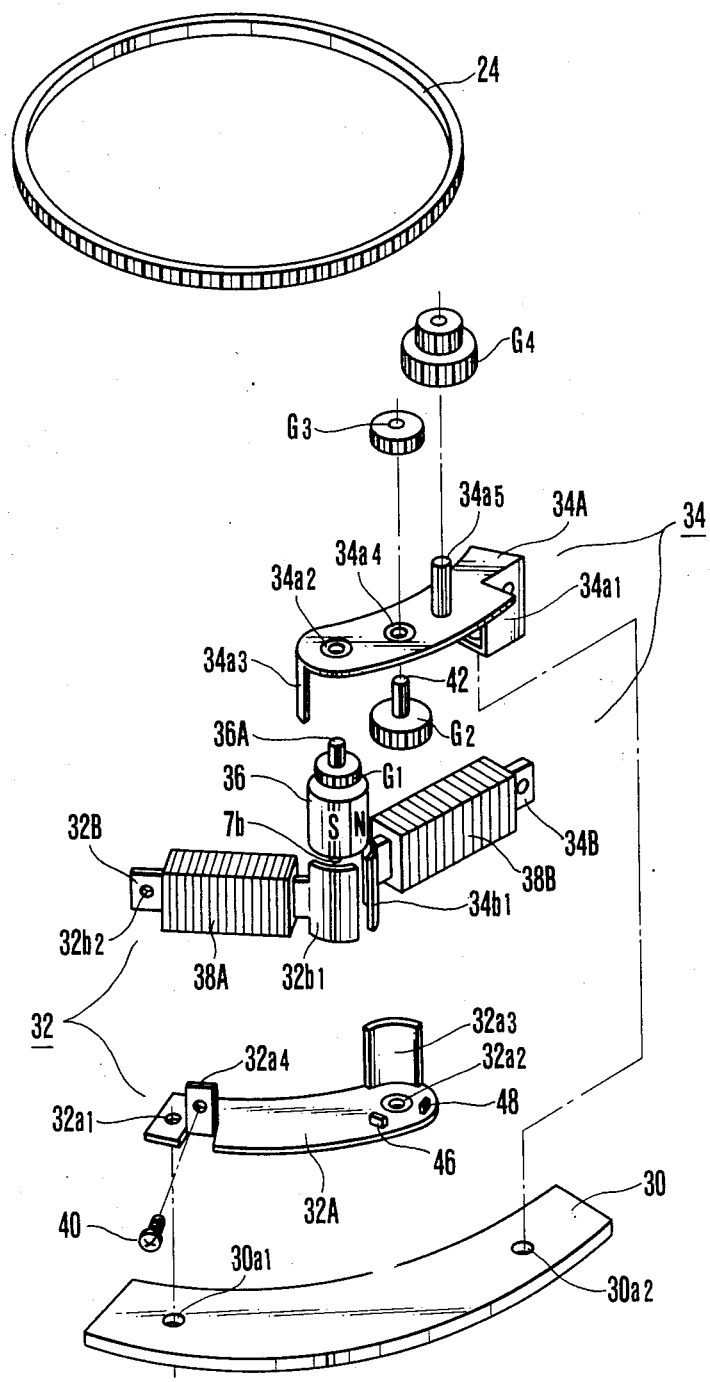
FIGS. 2A and 2B show a motor arranged as a first embodiment of this invention, FIG. 2A showing the essential parts in an exploded view and FIG. 2B in a plan view.
Figure 2B:
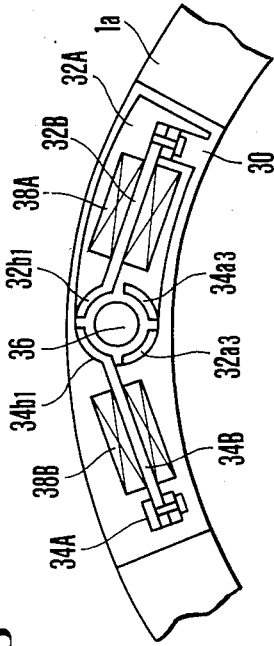

The motor which is related to this invention is arranged as described below with reference to FIG. 2A and ensuing drawings:

FIGS. 2A and 2B show the motor arranged as a first embodiment of this invention. A motor unit mounting base plate 30 is secured to a vertical wall part 1a of the fixed tube 1 shown in FIG. 1. The base plate 30 is formed approximately in an arcuate shape. The illustration includes yokes members 32 and 34 and a cylindrical rotor 36 which is made of a permanent magnet. The yoke 32 consists of two members 32A and 32B. The yoke member 32A is formed approximately arcuate flate shape and has a screw hole 32a1 arranged at one end to fix it to the base plate 30 through a screw hole 30a of the base plate. On the other end of the yoke member 32A is provided a bearing part 32a2 to carry the rotating shaft 36A of the rotor 36. A first magnetic pole part 32a3 is in an arcuate shape extending from one end of the yoke member 32A along the periphery of the rotor 36.

The yoke member 32B is in a plate shape as shown in FIG. 2A, or in rod-like shape (not shown). A second magnetic pole part 32b1 is arcuately formed at one end of the yoke member 32B. A mounting hole 32b2 is arranged at the other end of the yoke member 32B to have a yoke mounting bent up part 32a4 of the yoke member 32A attached thereto. An exciting coil 38A is wound round the plate-like part of the yoke member 32B. The exciting coil 38A may be wound in a rectangular (or in a not shown ring like shape) shape before it is fitted on the yoke member 32B. The yoke members 32A and 32B are fixed together by means of a screw 40. The other pair of yoke members 34A and 34B are formed in a manner similar to the yoke members 32A and 32B. The yoke member 34A consists of a flat part formed approximately in an arcuate shape; a mounting block 34a1 which is arranged at one end to fix the flat part to a screw hole 30a2 provided in the base plate 30; a bearing part 34a2 arranged to carry the rotating shaft 36A of the rotor; a third magnetic pole part 34a3 which extends along the periphery of the rotor; a gear bearing 34a4; and a shaft 34a5. The yoke member 34B and an exciting coil 38B are arranged in the same manner as the yoke 32B and the coil 38A.

The yoke members 32A and 32B are secured to the base plate 30. The lower end of a rotation shaft 36A which is secured to the rotor 36 is fitted into the bearing part 32a2. The yoke 34B is secured to the yoke 38A by means of a screw. The upper end of the rotating shaft 36A is fitted into the bearing part 34a2 of the yoke member 34A. These members are thus secured to the base plate 30.

FIG. 2B shows in a plan view the motor in an assembled state. Magnetic pole parts 32a3, 32b1, 34a3 and 34b1 are evenly spaced and disposed round the rotor 36 As obvious from FIG. 2B, the pair of yoke members the other pair of yoke members 32 and 34 and another pair of yokes 34A and 34B are arranged across the rotor 36 at an angle of about 180 degrees with the rotor centered between them. The motor is as a whole formed in an oblong shape vertically or transversely extending. The yokes 32A and 34A are arcuately formed according to the arcuate shape of the wall part 1a of the fixed tube included in the lens barrel. The base plate 30 are arranged in a shape not spreading to the outside of the base plate 30. A gear G1 is secured to the rotation shaft 36A. A gear G2 is carried by the yoke member 34A through a shaft 42 and is arranged to engage the gear G1. A gear G3 is secured to the shaft 42 and is arranged to engage a double gear G4 which is carried by the above stated shaft 34a5. The double gear G4 is arranged to engage the gear ring 24 of FIG. 1.

The driving force of the gear ring 24 is transmitted to the rotary ring 10 for driving the lens as mentioned in the foregoing. The yoke members 32A, 32B, 34A and 34B form the two stator yokes 32 and 34. The magnetic polarity of each of their magnetic pole parts becomes S or N according to the direction of a current flowing to the exciting coils 38A and 38B. Position detecting elements such as Hall elements 46 and 48 are arranged to detect the pole position of the rotor 36 for the purpose of obtaining a timing for applying a current to the exciting coils 38A and 38B. These elements 46 and 48 are disposed on the yoke member 32A and are separated at an angle of 90 degrees from each other relative to the rotation shaft of the rotor.

Figure 3:
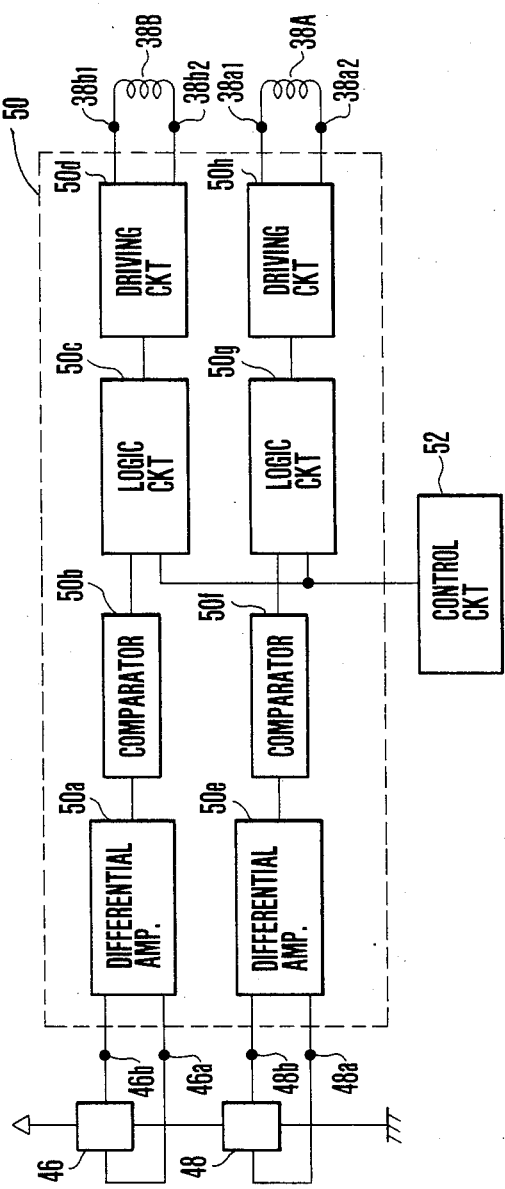
FIG. 3 is a block diagram showing a driving circuit provided for the motor.

FIG. 3 shows a current supply control circuit of the motor driving device shown in FIGS. 2A and 2B. The illustration includes the above stated Hall elements 46 and 48; the output terminals 46a and 46b of the Hall element 46 and the output terminals 48a and 48b of the Hall element 48; the current supply control circuit 50; the above stated stator coils 38A and 38B; the terminals 38a1 and 38a2 of the coil 38A; and the terminals 38b1 and 38b2 of the coil 38B. The current supply control circuit 50 includes differential amplifier parts 50a and 50e; comparator parts 50b and 50f; logic circuit parts 50c and 50g; and drive circuit parts 50d and 50h. The current supply control circuit 50 controls current supply to the stator coil 38A according to the output of the Hall element 46 and current supply to the stator coil 38 according to that of the Hall element 48. When the Hall element 46 confronts The S pole of the rotor 36, the relation between the output of its output terminals 46a and 46b, for example, become 46a>46b. Then, the current supply control circuit 50 supplies the coil 38A, for example, with a current flowing in the direction from the terminal 38a1 to the terminal 38a2. Next, when the Hall element 46 comes to confront the N pole (or S pole) of the rotor 36, the relation between the output voltages of the output terminals 46a and 46b of the Hall element 46 is reversed and becomes 46a<46b. The circuit 50 then reverses the direction of the current supply by allowing a current to flow from the terminal 38a2 to the terminal 38a1 of the coil 38A. Further, to prevent any oscillation when the Hall element comes to confront a point close to a boundary between the magnetic poles N and S, the comparator part 50b (or 50f) of the circuit 50 is arranged to have a predetermined hysteresis characteristic. The operation of the current supply control circuit 50 on the other Hall element 48 and the other stator coil 38B is exactly the same as the above stated operation on the Hall element 46 and the stator coil 38A.

A control circuit 52 is arranged to supply the current supply control circuit 50 with instruction signals relative to the rotating direction, start and stop of the rotor 36.

Figure 5:
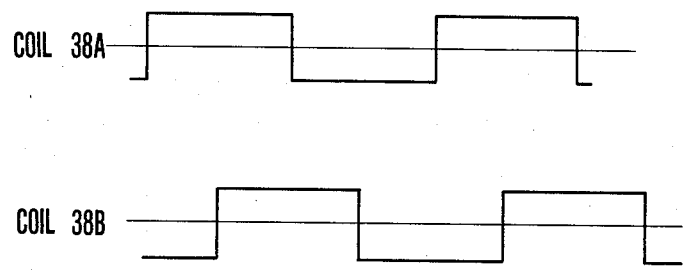
FIG. 5 is a waveform chart showing the outputs of exciting coils 38A and 38B.
Figure 6:
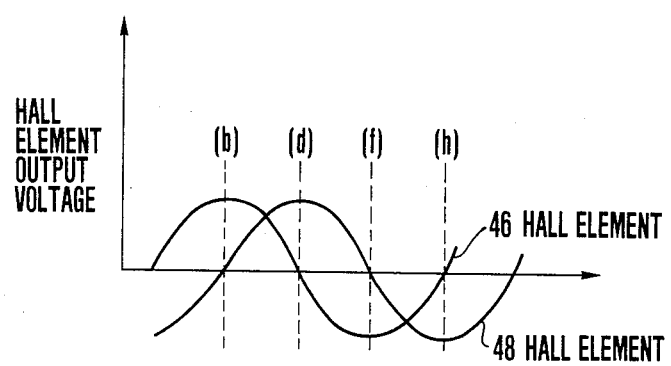
FIG. 6 shows the output wave form of a Hall element.

Referring to FIGS. 4A to 4H, 5 and 6, the arrangement described above operates as described below:

FIGS. 4A to 4H show the rotating states of the rotor 36. FIG. 5 shows voltages applied to the coils 38A and 38B with the coil terminals 38a1 and 38b1 used as fiducial points. FIG. 6 shows the output voltages of the Hall element 46 then obtained with the output voltages of their output terminals 46a1 and 48a1 used as fiducial points. Under the condition of FIG. 4A, let us assume that the current supply control circuit 50 performs control according to the outputs of the Hall elements 46 and 48 in such a way as to have the stator pole part 34$b$1 excited as a N pole, the stator pole part 34$a$3 excited as a S pole, the stator pole part 32$b$1 excited as a N pole and the stator pole part 32$a$3 excited as a S pole.

Then, the N pole of the rotor 36 is repelled by the N pole of the stator pole part 32$b$1. The S pole of the rotor 36 is repelled by the S pole of the stator pole part 32$a$3. Meanwhile, since the stator pole part 34$b$1 is energized to be the N pole, the S pole of the rotor 36 is attracted to and pulled by the N pole of the stator pole part 34$b$1. The N pole of the rotor 36 is pulled by the S pole of the stator 34$a$3 as the latter is energized to be the S pole. The rotor is thus rotated counterclockwise.

Figure 4A:
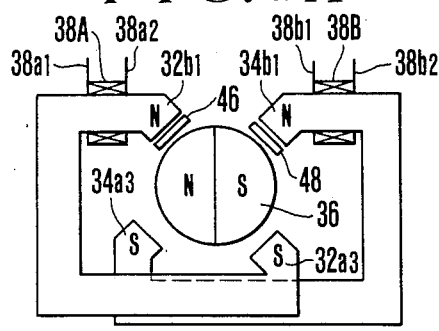
FIGS. 4A to 4H show driving states.
Figure 4E:
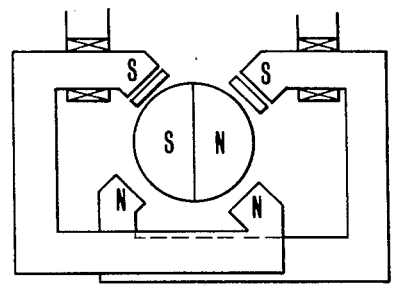
Figure 4B:
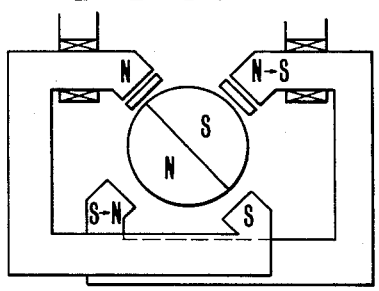
Figure 4F:
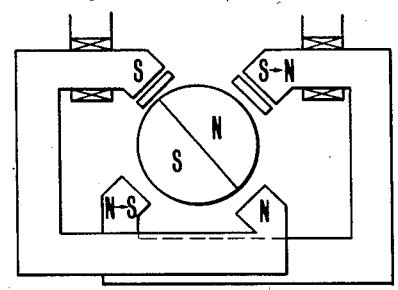
Figure 4C:
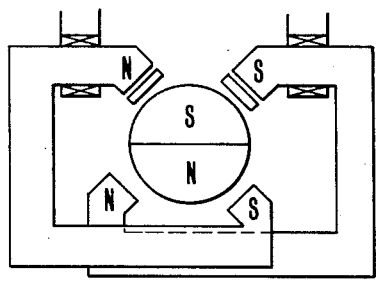
Figure 4G:
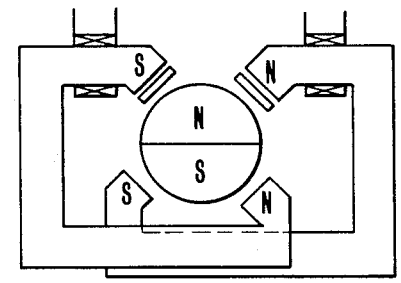

When the rotor 36 rotates 45 degrees from the position shown in FIG. 4A and comes to its position as shown in FIG. 4B, the output of the Hall element 46 is inverted. The current supply control circuit 50 then reverses the direction of the current supply to the stator coil 38B. As a result, a stator pole part 34$b$1 changes from a N pole to a S pole and the stator pole part 34$a$3 from the S pole to a N pole. The S pole of the rotor 36 is then repelled by the S poles of the stator pole parts 34$b$1 and 32$a$3 and is pulled by the N pole of the stator pole part 32$b$1. The N pole of the rotor 36 is likewise repelled by the N poles of the stator pole parts 32$b$1 and 34$a$3 and is pulled by the S pole of the stator pole part 32$a$3. Therefore, the rotor continues to rotate counterclockwise.

Figure 4D:
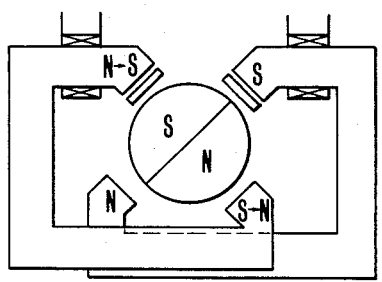
Figure 4H:
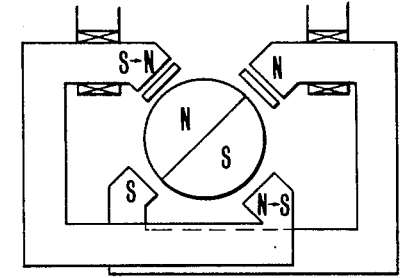

Under the condition of FIG. 4D, the output of the Hall element 48 becomes inverted. The direction of current supply to the stator coil 38A also becomes inverted to allow the counterclockwise rotation to continue. Further, with the rotor in the position of FIG. 4F, the output of the Hall element 46 becomes inverted and the current supply to the stator coil 38B also become inverted to allow the counterclockwise rotation to continue.

To cause the motor unit according to this invention to rotate clockwise, i.e. in the direction reverse to the above stated counterclockwise direction, the voltages to be applied to the stator coils 38A and 38B as shown in FIG. 5 are inverted between their terminals 38$a$1 and 38$a$2 and between the terminals 38$b$1 and 38$b$2 respectively.

The motor shown in FIGS. 2A and 2B can be arranged to be capable of producing a high torque despite its compact size by magnetizing the rotor 36 with two poles, because: The pole opening angle which is 90 degrees in terms of electrical angle can be made to be 90 degrees in a mechanical angle by two pole magnetization. This enables the whole circumference of the rotor 36 to be covered with four arcuate magnetic pole parts 32$a$3, 34$a$3, 32$b$1 and 34$b$1. Then, the magnetic flux generated by the rotor 36 can be caught almost completely by the magnetic pole parts without loss. This enhances the efficiency of torque conversion of the magnetic flux generated by the rotor 36 into a rotating force. Besides, the arcuate shape of the magnetic pole parts permits effective utilization of the magnetic flux generated by the rotor.

Figure 7:
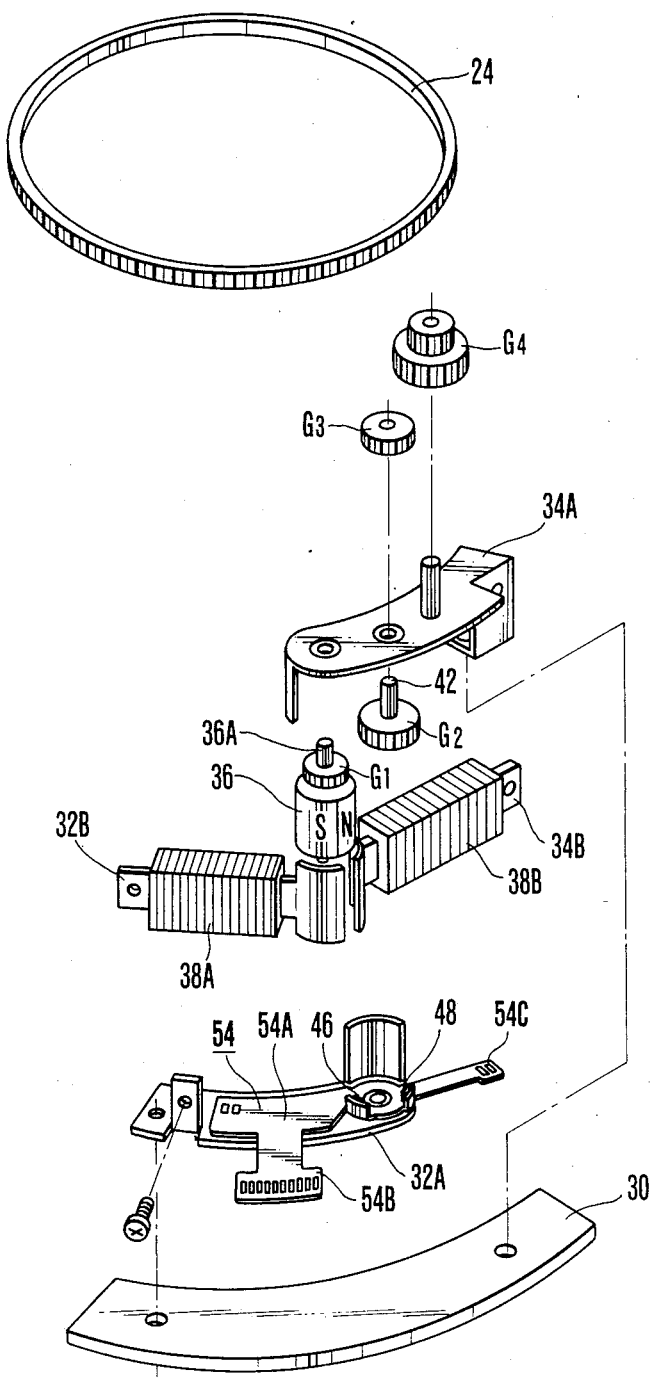
FIG. 7 is an oblique view showing another embodiment in which a Hall element is carried by a printed circuit board.

FIG. 7 shows an example of modification of the embodiment shown in FIGS. 2A and 2B. In this case, the Hall elements 46 and 48 are disposed on a printed circuit board 54. The printed circuit board 54 consists of a base part 54A which is formed along the arcuate flat part of the above stated arcuate yoke member 32A and extension parts 54B and 54C on which the terminals of wiring (not shown) are arranged. The Hall elements 46 and 48 are secured to the surface of the printed circuit board. The terminal parts (not shown) of the Hall elements are connected to the wiring provided on the printed circuit board. The rest of FIG. 7 are identical with corresponding parts shown in FIG. 2A. In the case of the embodiment shown in FIGS. 2A and 2B, the Hall elements 46 and 48 necessitate some insulating treatment on the flat plate part of the yoke member 32A before securing them to the yoke member with an adhesive or the like. Besides, the terminals of the Hall elements 46 and 48 must be connected to some lead wires before connecting them to the circuit shown in FIG. 3. Whereas, the use of the printed circuit board of FIG. 7 enables the Hall element fixing and wiring work to be carried out with increased efficiency.

Figure 8A:
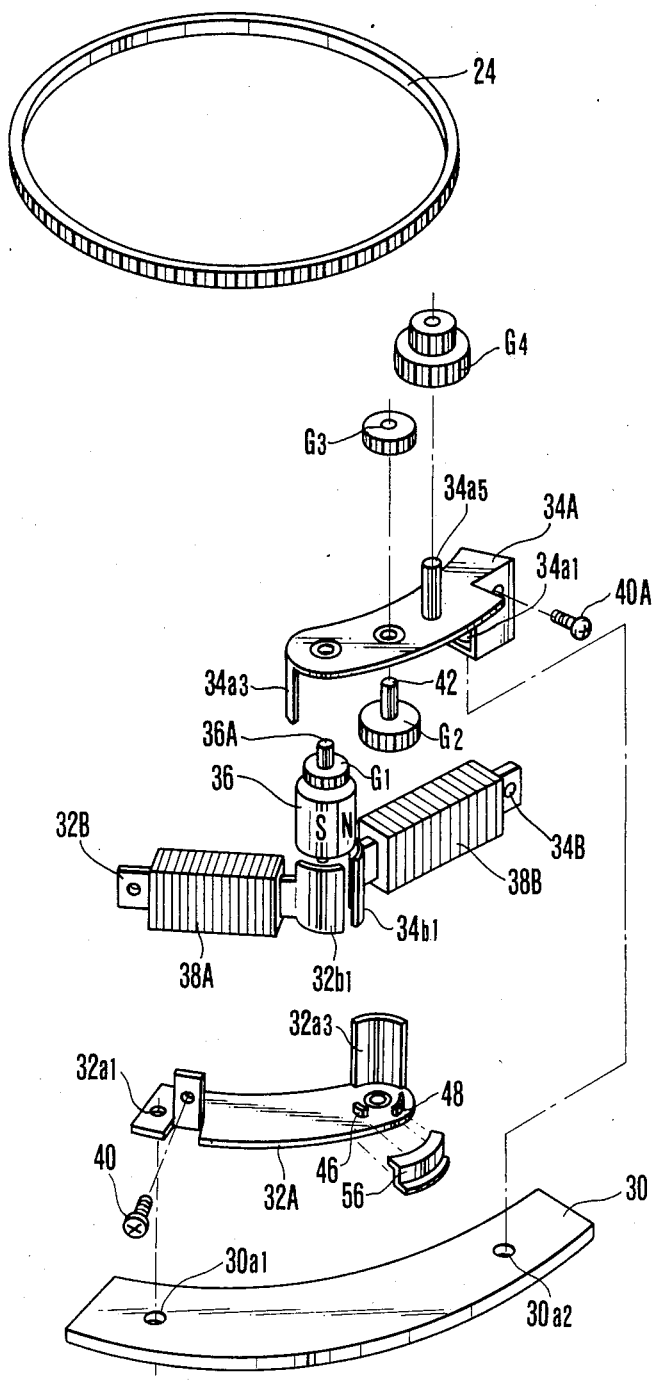
FIGS. 8A to 8D show examples in which there is provided magnetic shield means, FIGS. 8A and 8C showing the essential parts of the motor in exploded views and FIGS. 8B and 8D schematically showing the yokes 32A and 32B and a rotor 36 in sectional views.
Figure 8B:
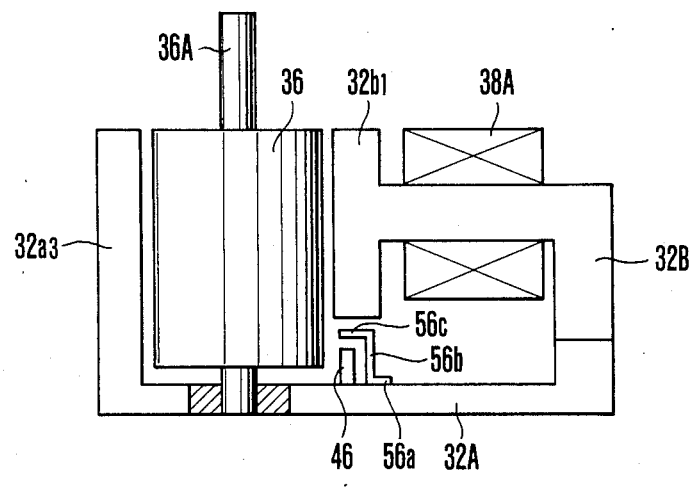

FIGS. 8A and 8B show a second embodiment of this invention. In detecting the magnetic flux of the rotor 36 by means of the Hall elements 46 and 48, the pole position detecting accuracy lowers if some magnetic flux is received by the Hall elements. In that event, the timing of the current supply to the exciting coils 38A ad 38B would become inaccurate. To prevent this, the second embodiment is provided with a magnetic shield.

With the exception of a shield member 56, all the parts of the motor shown in FIGS. 8A and 8B are arranged in the same manner as in the case of FIG. 2. The shield member 56 is formed into an angular shape as shown in FIG. 8B. The member 56 is made of a magnetic material and includes a mount part 56$a$ for mounting it on the flat face of the yoke member 32A; a vertical part 56$b$ extending along the side walls of the Hall elements 46 and 48; and a shield part 56$c$ which is interposed in between the Hall elements and the magnetic pole parts 32$b$1 and 34$b$1 and is thus arranged to prevent any magnetic flux from the magnetic pole parts from coming to the Hall elements With the second embodiment arranged in this manner, any magnetic flux that is generated by the magnetic pole parts 32$b$1 and 34$b$1 is blocked by the shield member. This ensures that the Hall elements receive only the magnetic flux that is produced from the rotor 36, so that change-over of the current supply to the exciting coils 38A and 38B can be accurately accomplished.

Figure 8D:
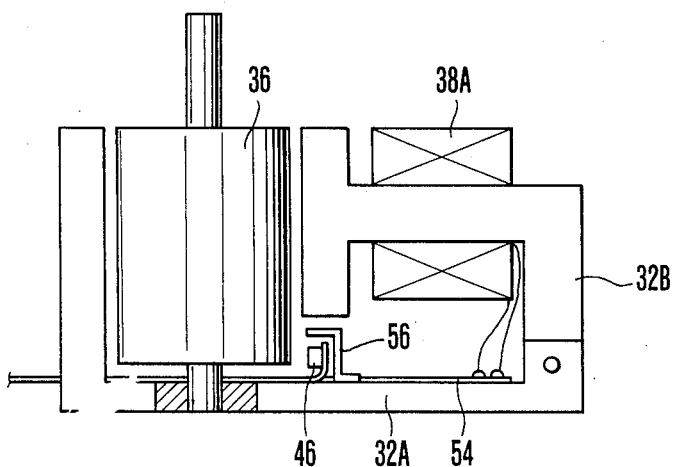
Figure 8C:
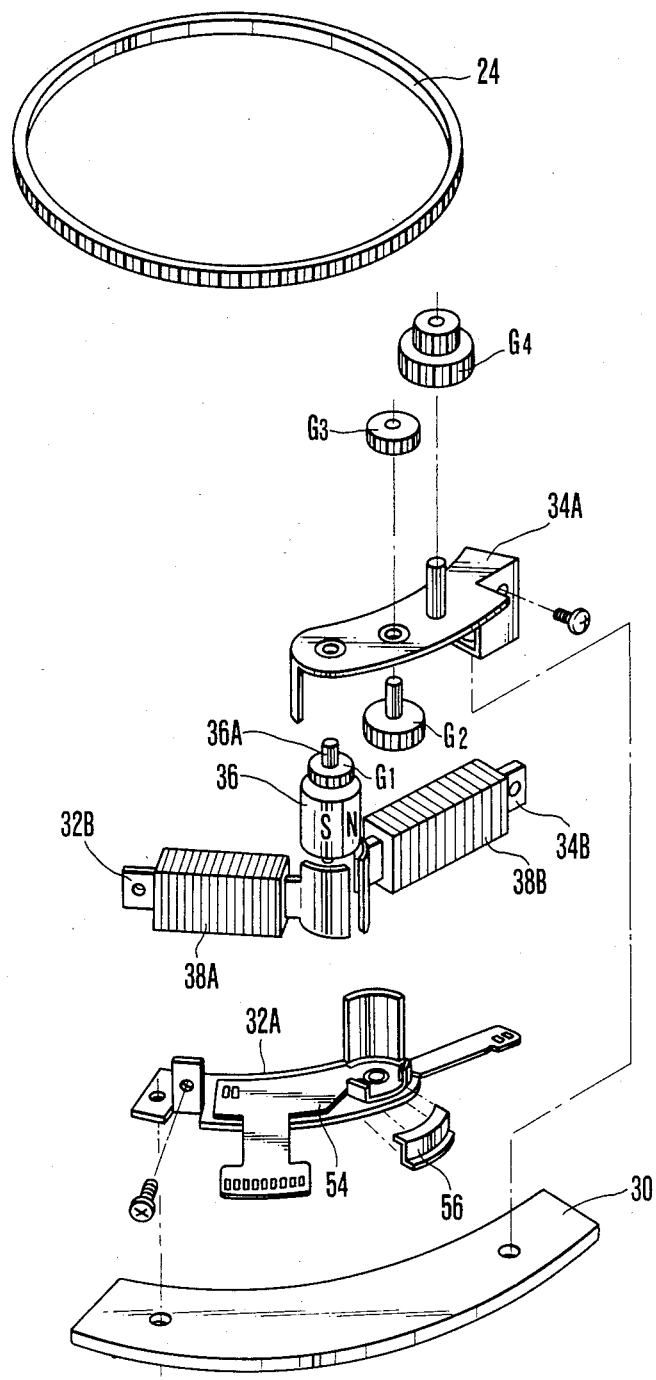

FIGS. 8C and 8D show an example of modification of the embodiment shown in FIGS. 8A and 8B. In this case, the Hall elements disposed on a printed circuit board 54 as shown in FIG. 7 is arranged to be magnetically shielded. The Hall elements 46 and 48 is secured to the printed circuit board 54. A shield member 56 is secured to the yoke member 32A in such a way as to avoid the printed circuit board 34. The rest of the parts of the motor are identical with the corresponding parts of FIGS. 8A and 8B.

Figure 9A:
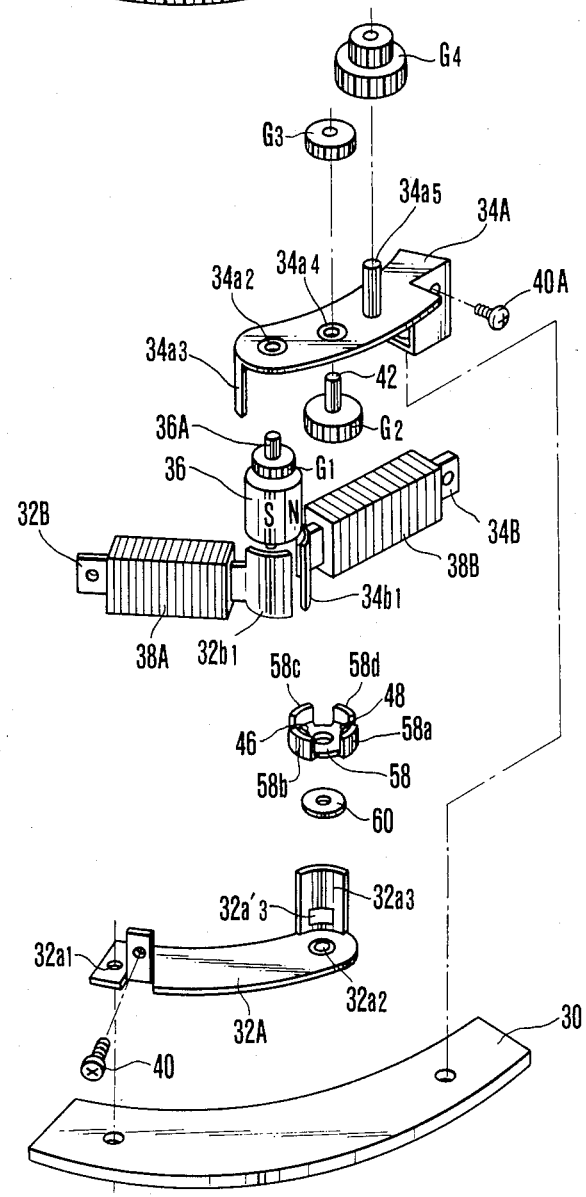

FIGS. 9A to 9D, 10A, 10B and 10C show a third embodiment of this invention. For higher efficiency of detecting the magnetic flux of the rotor 36, the third embodiment is arranged to have the magnetic flux circuit of the rotor 36 and the Hall elements 46 and 48 formed into a closed loop magnetic circuit. Meanwhile, the rest of the motor arrangement are identical with the arrangement shown in FIGS. 2A and 2B and, therefore, are omitted from the description given here. As shown in FIG. 9B, the Hall elements 46 and 48 are opposed to the rotor 36. In a state of having no current supply to the stator coil 38A, the rotor 36 produces a magnetic field H1 in a space 58A which includes the Hall elements as shown in FIG. 9D. A magnetic field H2 is produced when the current supply is effected to the stator coil 38A. While the motor is in operation, both the magnetic field H1 produced from the rotor 36 and the magnetic field H2 produced from the stator coil exist within the space 58A. The efficiency of the motor lowers unless the rotating position of the rotor 36 is accurately detected. To accurately detect the rotating position of the rotor 36, therefore, the magnetic field H1 must be accurately detected while the other magnetic field H2 is nothing else but a noise.

The third embodiment, as shown in FIG. 9A, has a holder 58 provided with a shaft hole 58a for a rotation shaft 36A, Hall element carrying parts 58b and 58c which are opposed to the outer circumferential face of the rotor 36 and upright parts 58d and 58e for forming a magnetic circuit, and a spacer 60 interposed in between the holder 58 and a yoke member 32A. The spacer 60 is arranged to protect the yoke member 32A against a leak of the magnetic flux of a closed loop magnetic circuit formed by the rotor 36, the Hall elements 46 and 48, the Hall element carrying parts 58b and 58c and the upright parts 58d and 58e. The spacer 60 and the holder 58 are secured to the yoke member 32A.

The magnetic flux of the rotor 36 which is to be used in detecting the rotating position of the rotor 36 flows to a closed loop formed in the order of the rotor 36—the Hall element 46 or 48—the holder 58—the rotor 36. Therefore, the magnetic field 58A which includes the Hall element is more intensive in the direction effective for detection of the rotating position than the intensity of a magnetic field resulting from the current supply to parts other than the rotor, such as the coils. The embodiment is therefore capable of accurately detecting the rotating position of the rotor 36.

A recess 32a3' is formed on the inner arcuate side of the magnetic pole part 32a3 and is arranged to engage and carry the upright part 58d of the holder 58.

Figure 10B:
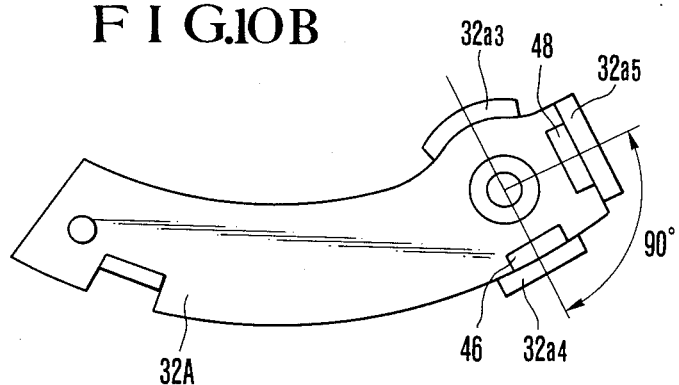
Figure 10C:
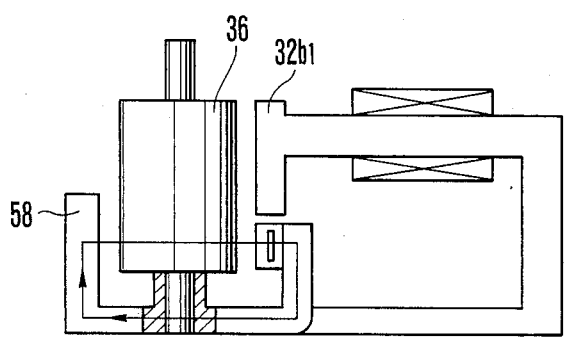
Figure 10A:
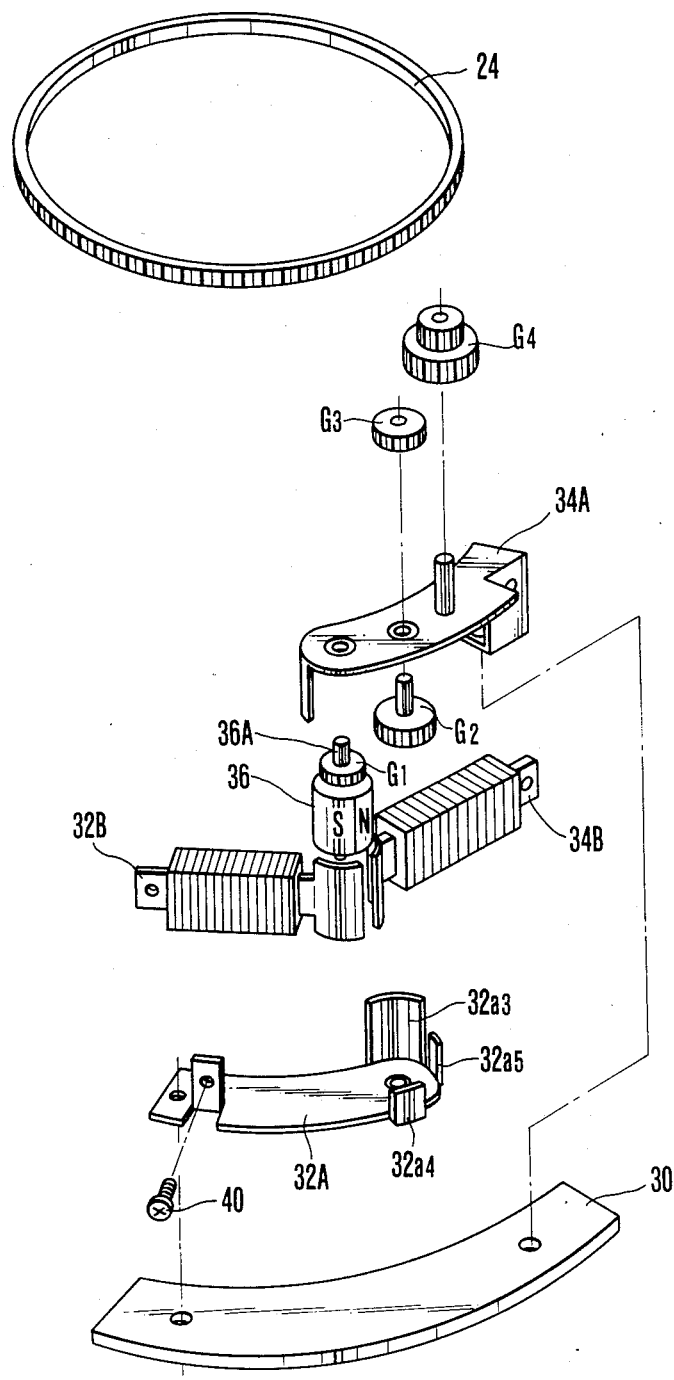

FIG. 10A shows an example of modification of the third embodiment shown in FIG. 9A. In this case, the holder 58 is formed in one body with the first yoke member 32A. The parts which are the same as those shown in FIG. 9A are indicated by the same reference numerals and their details are omitted from the following description:

The first yoke member 32A is provided with upright parts 32a4 and 32a5 for setting the Hall element 46 and 48 in place FIG. 10B shows in a plan view the first yoke member 32A. The Hall element 46 is disposed at the upright part 32a4 and the other Hall element 48 at the upright part 32a5. As shown, the center lines of the Hall elements 46 and 48 form an angle of about 90 degrees. FIG. 10C shows the positional relation of the rotor 36 to the magnetic pole parts and the Hall element 46. The rate of the influence of a magnetic flux on the Hall element silently varies with the direction in which the element is disposed. In the case of FIG. 10C, with an exciting current is allowed to flow to the Hall element, the Hall element 46 produces an output voltage upon receipt of the magnetic flux of the rotor 36 and is almost completely free from the influence of the magnetic pole part. As a result, the modification excels in the S/N ratio. More specifically, with the closed loop of a magnetic path formed in the order of the rotor 36—the Hall element 46—the upright part 32a4—the first yoke member 32A—the stator—the rotor 36, a great amount of magnetic flux passes through the Hall element, so that the rotating position of the rotor can be detected without much adverse effect of a magnetic field produced by any other part than the rotor magnet, such as the magnetic field resulting from the current supply to the coil. The Hall elements 46 and 48 are secured to a flexible printed circuit board or the like which is not shown. The output voltages of the Hall elements are taken out. Then, the rotation of the motor is controlled by controlling the direction of the driving current flowing to the coil according to the outputs of the Hall elements.

Figure 9E:
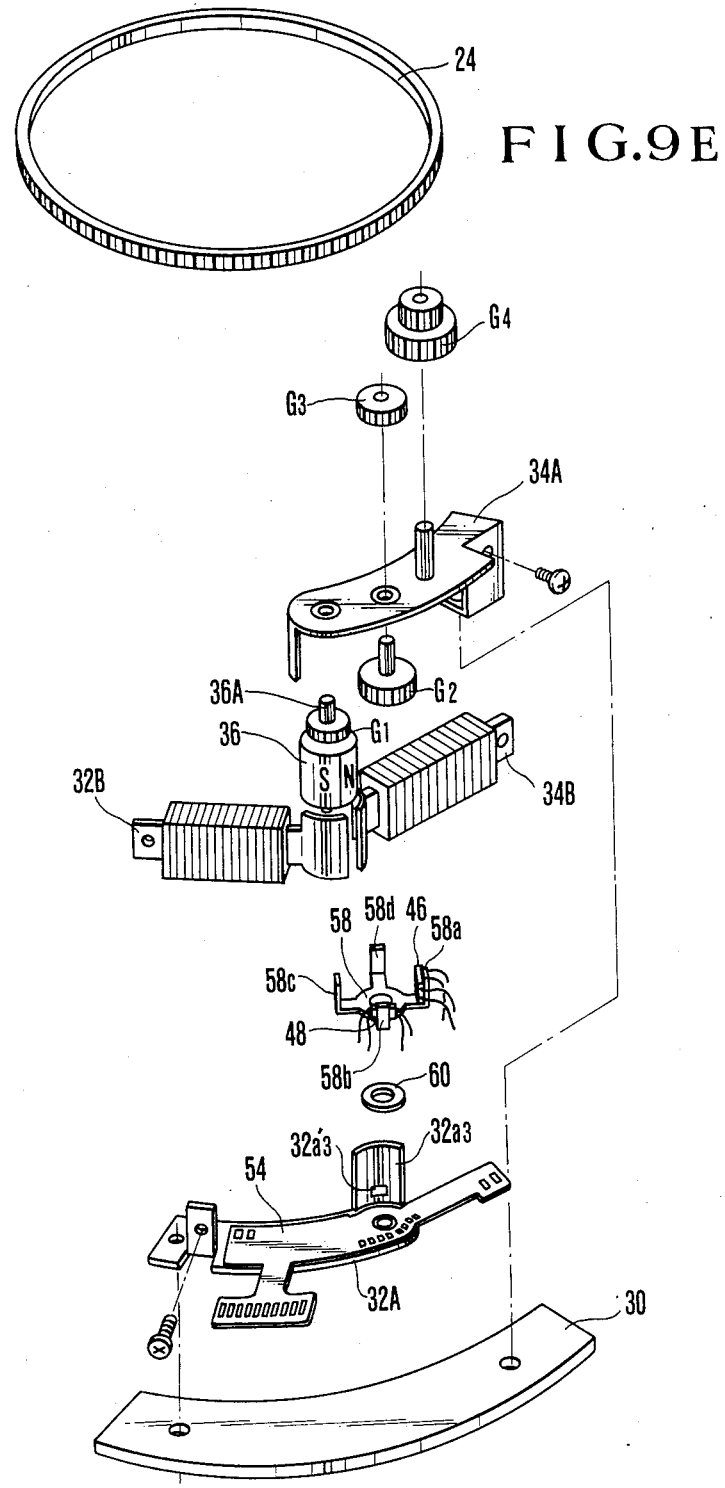
Figure 9F:
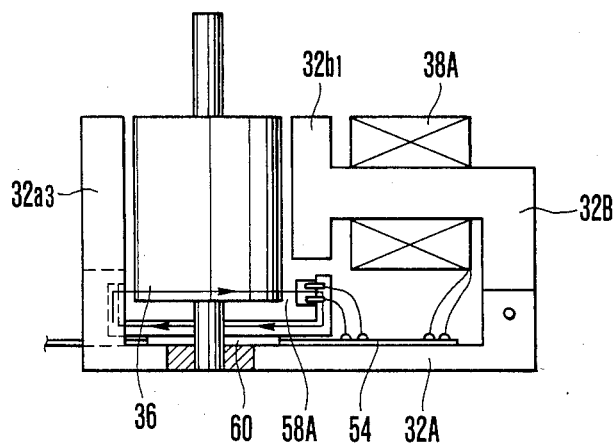

FIGS. 9E and 9F show by way of example the manner in which the Hall elements of the motor arranged as shown in FIGS. 9A to 9D are disposed on the printed circuit board 54. The printed circuit board 54 is arranged in the same manner as in the case of FIG. 7.

Figure 10D:
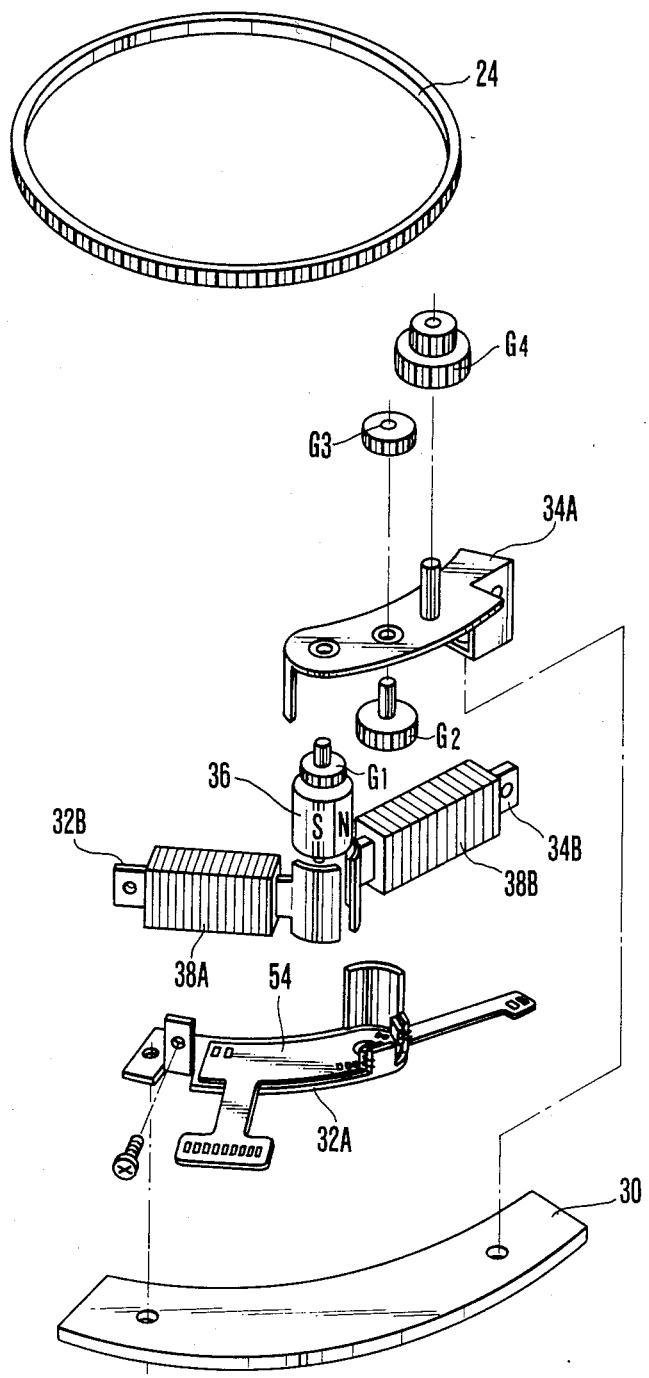

FIG. 10D shows a case where the Hall elements which are arranged as shown in FIG. 10A are disposed on a printed circuit board 54. All the parts other than the printed circuit board 54, are arranged in the same manner as in the case of FIGS. 10A, 10B and 10C.

Figure 11A:
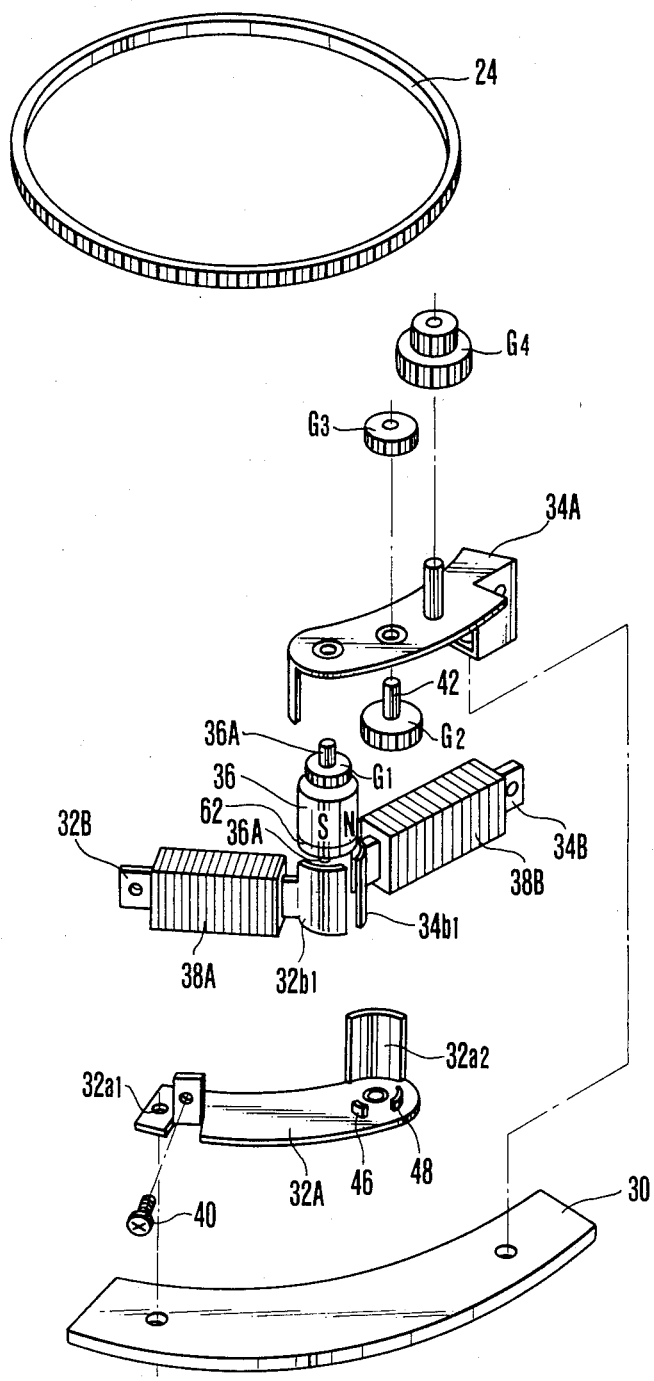
FIGS. 11A to 11D show a motor having a second magnet 62, FIGS. 11A and 11D showing the essential parts of the motor in exploded views and FIGS. 11B and 11C detecting arrangement with the second magnet 62.
Figure 11B:
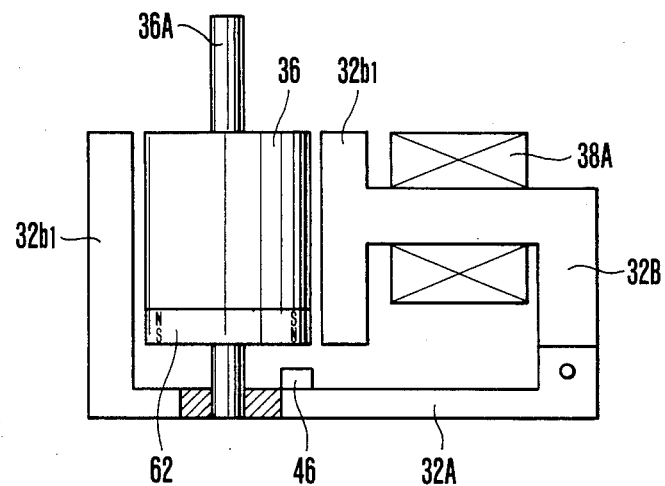
Figure 11C:
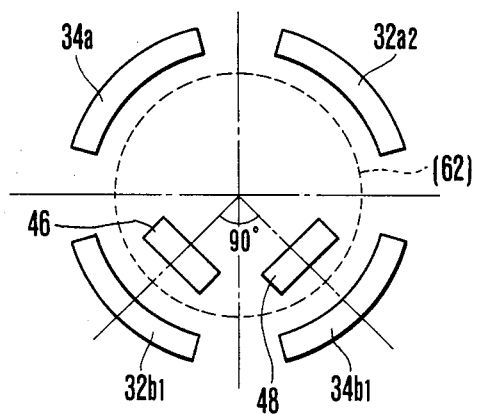

FIGS. 11A, 11B and 11C show a motor in which the magnetic pole position of the rotor arranged as shown in FIGS. 2A to 6 is arranged to be detected in a different manner. With the exception of that the Hall elements are differently disposed and that a magnetic pole position detecting magnet 62 is secured to the lower end face of the rotor 36, the rest of the motor shown in FIGS. 11A, 11B and 11C are arranged in the same manner as other motors. The modified points are as described below:

The detecting magnet 62 is magnetized with poles N - S arranged in the axial direction of the rotation shaft 36A of the rotor as shown in FIG. 11B. The magnet 62 is secured to the lower end face of the rotor 36. The rotation shaft 36A pierces the magnet 62 and is rotatably carried by the bearing part of the above stated yoke member 32A. The Hall elements 46 and 48 are disposed within the surface area of the detecting magnet 62 and are secured to the surface of the yoke member 32A.

Figure 11D:
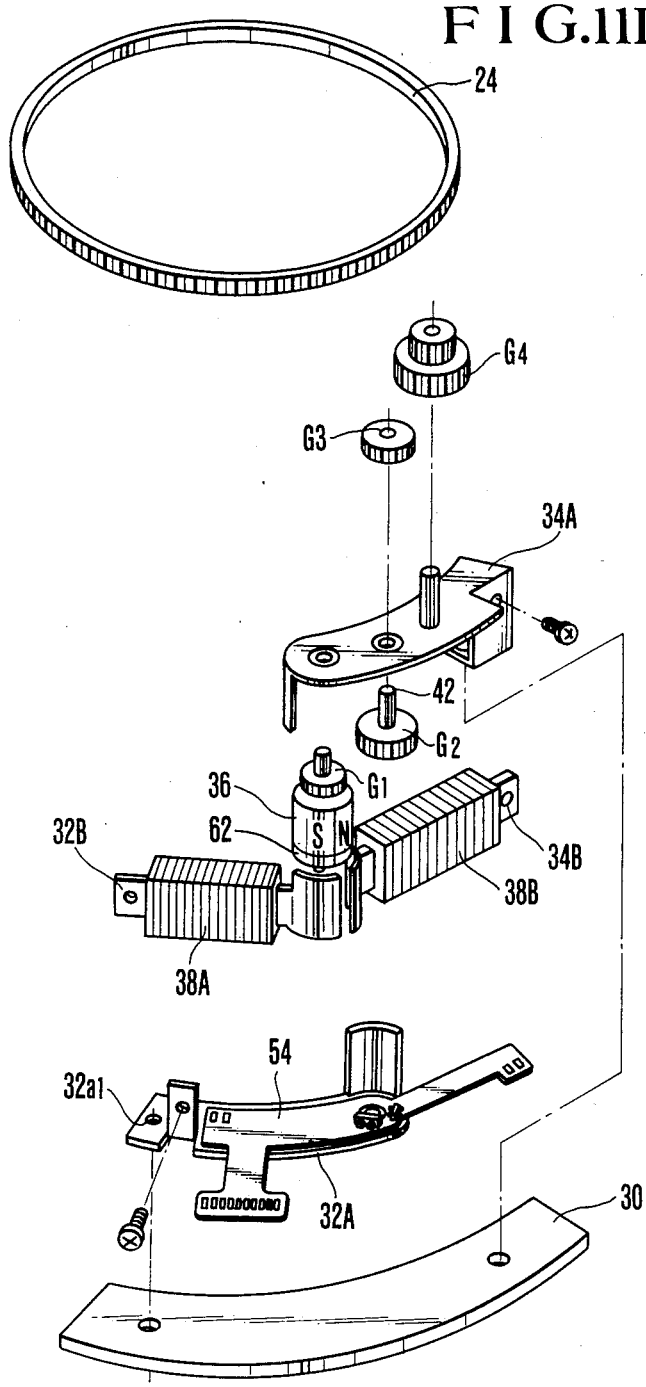

The Hall elements 46 and 48 are arranged to detect only the magnetic flux of the detecting magnet 62 and are not affected by any leak of a magnetic flux of the magnetic pole part 32b1. Therefore, the accuracy of detection of the position of the rotor and the timing of the current supply to the coil can be enhanced. FIG. 11D shows an example, wherein the Hall element is secured to the surface of the printed circuit board 54.

As shown in FIG. 11D, in accordance with the arrangement of this embodiment, the magnetic flux from the rotor is receivable through the whole rotor confronting surface area of the magnetic pole part 32d1. In cases where the Hall elements are disposed in between the rotor and the magnetic pole part, the rotor confronting area of the magnetic pole part includes a portion thereof occupied by the Hall elements and, therefore, this portion is unable to contribute to the generation of a torque. Whereas, this arrangement of the embodiment enables the magnetic flux generated by the rotor to be more effectively utilized in generating the torque.

Figure 12A:
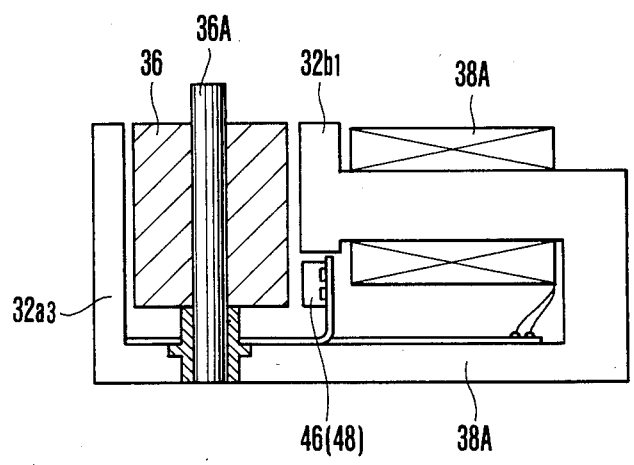
FIGS. 12A to 12F show by way of example a motor having demagnetizing means, FIGS. 12A and 12B showing the demagnetizing means, FIGS. 12C and 12F a Hall element and demagnetizing means and FIGS. 12D and 12E the arrangement of the demagnetizing means.
Figure 12B:
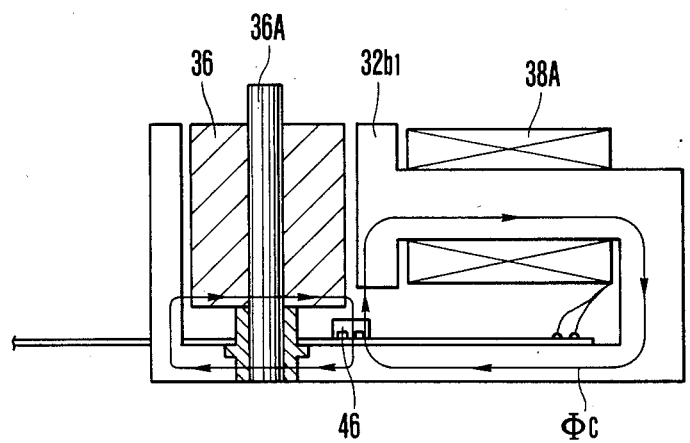

FIGS. 12A to 12F show examples wherein the adverse effect of the magnetic field due to the magnetomotive force of the exciting coil can be eliminated in accordance with this invention. Of these drawings, FIGS. 12A and 12B show the action of the magnetomotive force of the exciting coil. The motor which is arranged according to this invention has the Hall elements 46 and 48 opposed to the magnetized surface of the permanent magnet rotor 36 as shown in FIG. 12A. The arrangement effectively prevents the outputs of the Hall elements 46 and 48 from being affected by the current supply to the coil. Therefore, the rotating position of the permanent magnet rotor can be accurately detected. While this is an advantage on one hand, the arrangement prevents the magnetic pole part 32b1, on the other hand, from having a sufficiently large area confronting the rotor because of the presence of the Hall elements opposed thereto. As a result, the obtainable torque is insufficient for the size of the arrangement. This problem is solved in the manner as described below:

As shown in FIG. 12B, if the Hall elements 46 and 48 are arranged to be perpendicular to the magnetized surface of the permanent magnet rotor 36 in such a way as to detect a leak magnetic flux from the rotor. This arrangement enables the stator to have a larger surface confronting the rotor. However, it increases fluxes interlinked between the rotor and the coil. Then, the Hall elements is affected by the magnetomotive force of the coil indicated by a symbol $\Phi c$ in FIG. 12B. Therefore, such arrangement is incapable of accurately detecting the rotating position of the rotor. In accordance with it, the timing of change-over of the current supply to the coil becomes inaccurate to. It either lowers the efficiency of the motor or fails to generate any torque or brings about the rotating position of the rotor which results in a reverse torque. The magnitude of the magnetic field $\Phi c$ which acts as a noise on the Hall elements is proportional to the current flowing to the coil 38A.

Figure 12C:
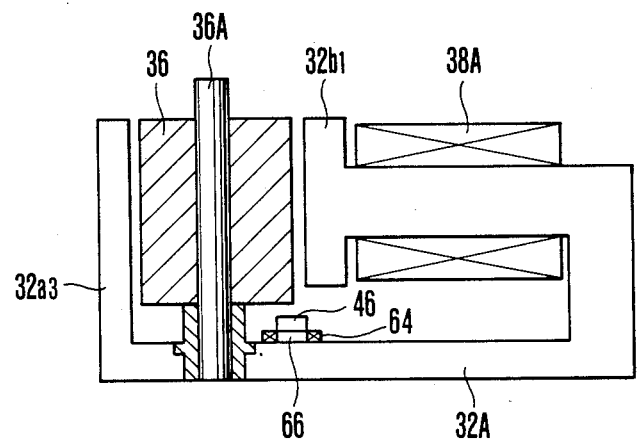
Figure 12D:
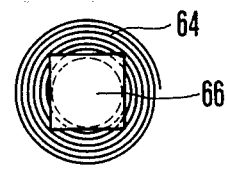

To solve this problem, this embodiment is provided with a cancel coil which is arranged either above or below the Hall elements to cancel out the magnetic field $\Phi c$ due to the coil. The cancel coil and the exciting coil are connected in series. When a change takes place in the current flowing to the coil and accordingly in the magnetic field $\Phi c$ due to a change in the power supply voltage or generation of a counter electromotive force, the magnetic field generated by the cancel coil also changes. The cancel coil is wound in the direction of cancelling out the magnetic field produced by the exciting coil and has such a number of turns that ensures no adverse effect thereof on the outputs of the Hall elements Referring to FIGS. 12C, 12D and 12E, this embodiment is arranged as follows: In FIG. 12C, the yoke members 32A and 32B, the magnetic pole parts 32a3 and 32b1, the exciting coil 38A, the rotor 36 and the rotation shaft 36A are arranged in the same manner as in the case of FIGS. 2A and 2B respectively. A magnetic field cancel coil 64 is wound round an iron core member 66. With the cancel coil 64 wound round the iron core member 66 as shown in FIG. 12D, the Hall element 46 is secured to the iron core member 66. The terminal of the cancel coil 64 is series connected to the exciting coil 38A.

Figure 12E:
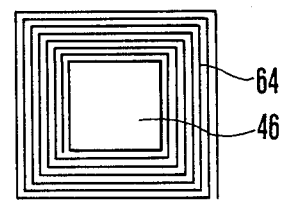
Figure 12F:
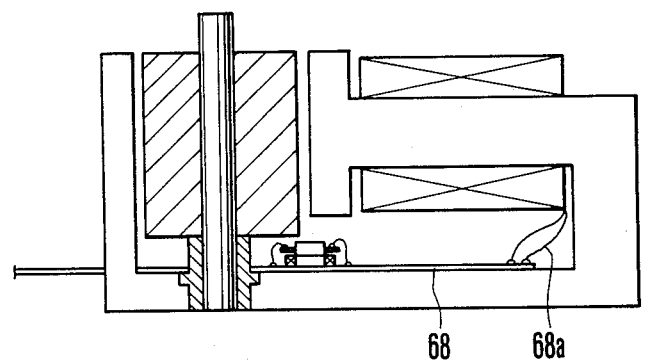

In the case of FIG. 12F, the iron core member 66 of the cancel coil 64 shown in FIGS. 12C and 12D is secured to the surface of a printed circuit board 68. In a further example, the printed circuit board 68 is disposed on the yoke member 32A with the cancel coil provided on the printed circuit board in the form of printed wiring which is not show.. Then, the Hall element 46 is secured to the printed circuit board 68. The terminals of the Hall elements are also connected to the printed wiring of the printed circuit board 68. The printed wiring is connected to the exciting coil 38A via lead wires 68a.

FIG. 12E shows by way of example a modification of the winding of the cancel coil. In this instance, the cancel coil 64 is wound directly round the Hall element 46. The cancel coil may be arranged for only one of the Hall elements. However, the cancel coil is preferably provided for both of the Hall elements.

Figure 13A:
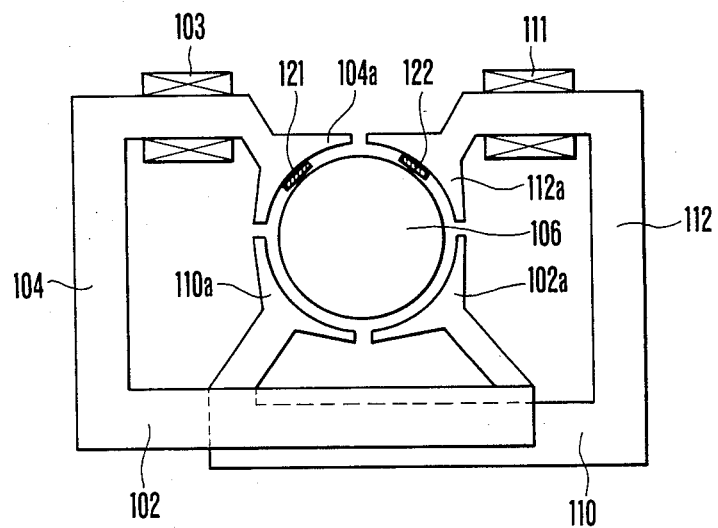

FIG. 13A shows an improvement on the invented motor in terms of the torque thereof. When a current is allowed to flow to the exciting coil of the motor which is arranged as shown in FIGS. 2A and 2B, the yoke is magnetized. Assuming that the reluctance of the yoke in its part excluding the inside of the magnet and a gap part is R, the permeability of the stator is $\mu$ and the sectional area of the magnetic pole part of the yoke is S, the reluctance can be expressed as $R \infty 1/\mu$ S. In other words, the reluctance is inversely proportional to the sectional area of the magnetic pole part of the yoke. Therefore, with the dimension of the magnetic pole part in the direction of thickness assumed to be unvarying, the reluctance between adjacent stators increases according as the width of the yoke decreases as shown in FIG. 13A.

Referring to FIG. 13A, in case that a stator 104a has the N pole, a stator 102a the S pole, a stator 112a the N pole and a stator 110a the S pole, no magnetic flux flows from the N pole of the stator 104a to the S pole of the stator 110a and then the loss of lines of magnetic force becomes smaller.

Figure 13B:
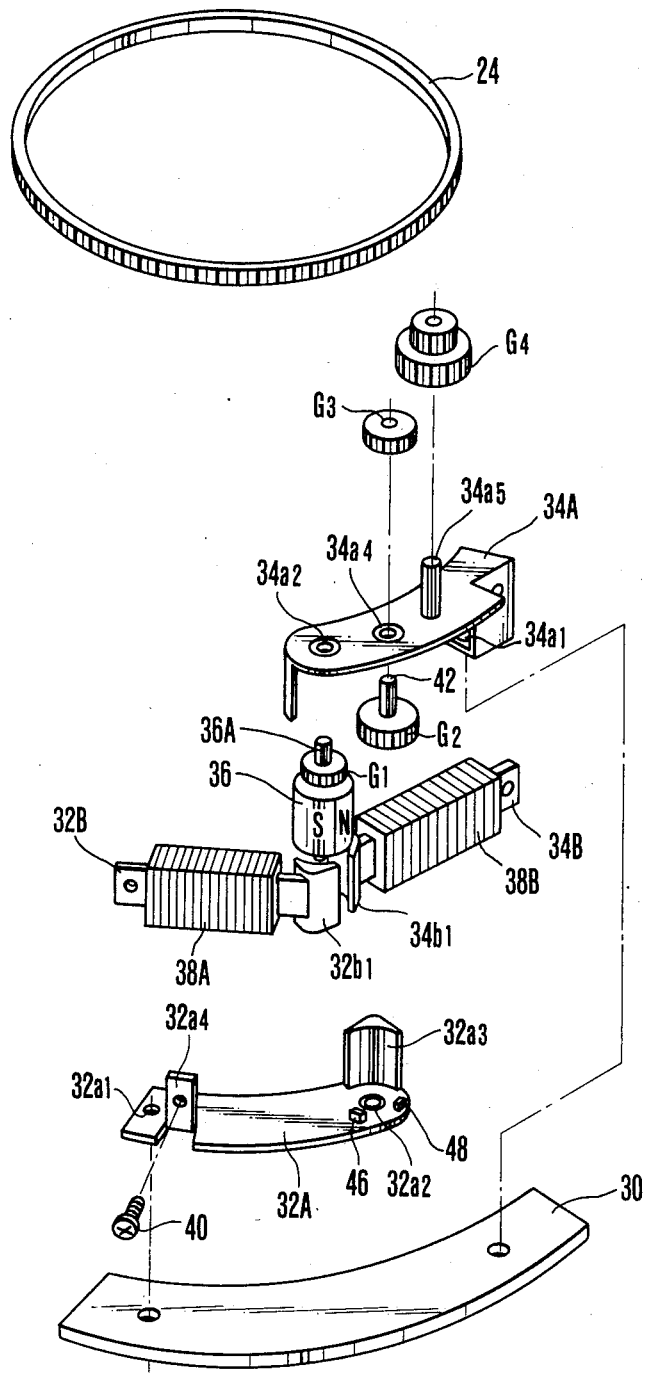

FIG. 13B shows a motor in which the outer sides of the arcuate parts of the magnetic pole parts 32b1, 32a3, 34b1 and 34a3 in the yoke member are arranged to have their thickness gradually decrease in the direction from the center of the pole parts to the ends thereof.

FIG. 13C shows in a graph the output torque of the motor shown in FIG. 13B in comparison with that of the motor shown in FIGS. 2A and 2B. In the graph, the axis of ordinate shows the torque (g-cm) and the axis of abscissa the change of torque per turn. As shown, the magnetic pole part having the even thickness at its outer arcuate side as shown in FIGS. 2A and 2B has greater variations in torque as indicated by a full line in FIG. 13C. Whereas the magnetic pole part having the outer arcuate side thereof arranged to gradually decrease as shown in FIG. 13B has a smaller variations in torque as indicated by a broken line in FIG. 13C. Therefore, the output torque can be increased as a whole by the latter arrangement.

FIGS. 14A to 14G show a further embodiment of this invention. In each of the embodiments described in the foregoing, the stators are in an oblong shape along the base. The paired stators are fixedly interconnected at their rear ends while their fore end parts are opposed to form a magnetic pole part with a predetermined air gap left between each of them and the rotor.

The compact motor of such a narrow width is required to have the air gap accurately and uniformly arranged between the rotor and each of the stators.

However, in the motors proposed as mentioned in the foregoing, the air gap between the circumferential face of the rotor and the fore end parts of the paired stators is arranged to be defined on the basis of the manufacturing precision of the stators despite of a large length between their rear end conjunction parts and their fore end parts which confront the rotor to form the air gap. Therefore, each stator has been required to be manufactured at an extremely high degree of precision and, at the same time, with a high degree of rigidity against deformation. This has resulted in high cost.

In a conceivable solution of this problem, a dummy rotor having an outside diameter larger than the rotor by a degree as much as the air gap is employed as a positioning jig; and each stator is brought into contact with he circumferential face of the dummy rotor and is temporarily fixed in that position before it is permanently positioned with a screw. In accordance with this method, however, the stator must be fixed in position by means of some adhesive or the like as no position defining member is provided for the stator. The method, therefore, not only lowers mass productivity but also hinders formation of a magnetic path. Besides, the method does not ensure a sufficient degree of precision of the air gap because of some deformation of the adhesive that possibly takes place during its setting process Whereas, this embodiment includes a stator carrying arrangement for a motor which is capable of solving the above stated problem by virtue of its structural arrangement which enables the stators to be easily, accurately and reliably positioned. The details of the embodiment are as follows: A plurality of pairs of stators are arranged round the rotor which is made of a permanent magnet The motor is formed with an exciting coil wound round at least one of each pair of the stators. The rear end part of one of each pair of stators is fixed to the other stator. The fore end part of the other stator is arranged to be a free end for keeping the gap between the rotor and to have its position adjustable by position adjustment means.

Figure 14A:
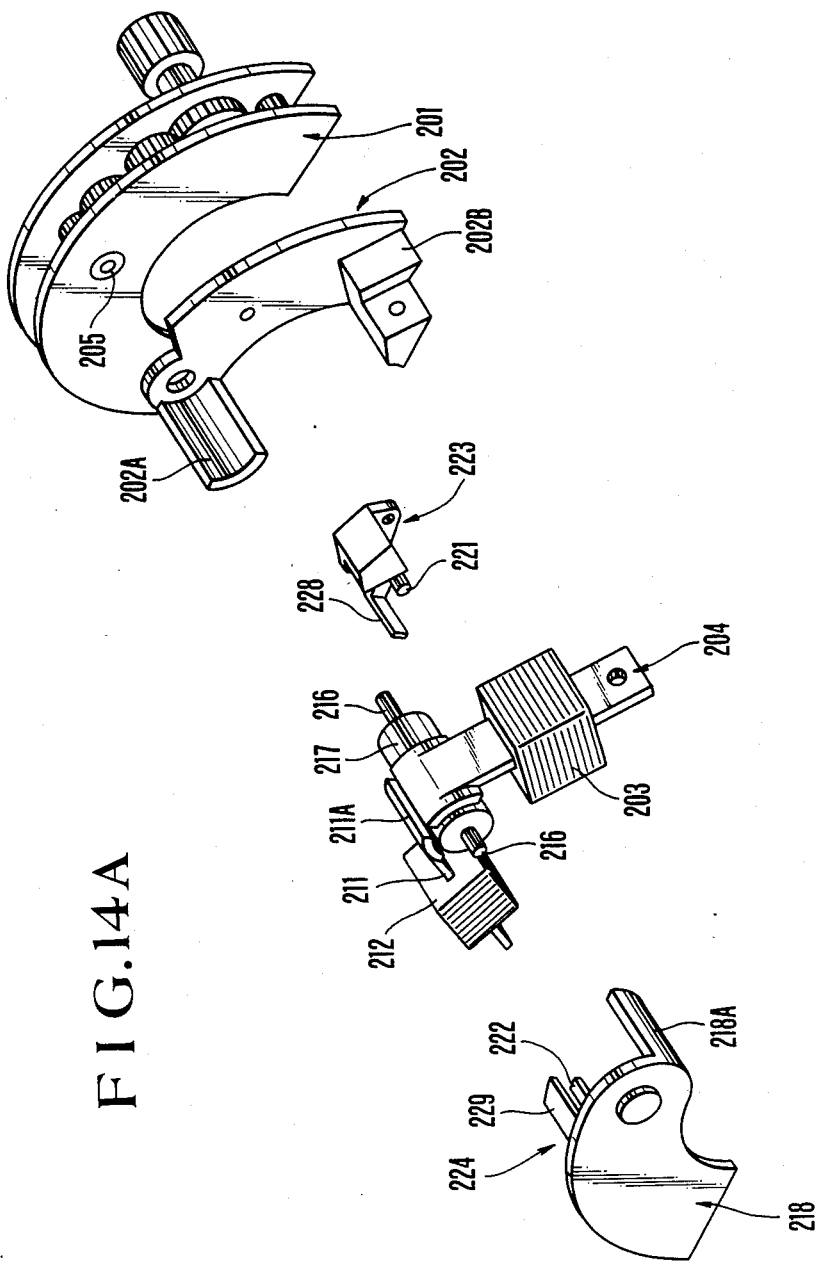
FIGS. 14A to 14G show a motor having adjustment means for adjusting the positions of the rotor and the stators of the motor, FIG. 14A showing in an exploded oblique view the motor having a stator carrying structural arrangement, FIG. 14B showing a stator guide in a longitudinal section, FIG. 14C showing the same stator guide in a plan view, FIG. 14D showing another example of the stator guide in a longitudinal section, FIG. 14E showing the same in a plan view, FIG. 14F showing a further example of the stator guide in a longitudinal section and FIG. 14G showing the same in a plan view.

FIG. 14A shows in an exploded oblique view the motor of this embodiment having the above stated stator carrying arrangement. The motor comprises a rotor 217 which is made of a permanent magnet and is pivotally carried by an arcuately shaped base 201; a plurality of pairs of stators 202, 204, 211 and 218 made of a magnetic material forming a plurality of pairs (two pairs in this case) of magnetic pole parts, including a pair 202A and 204A and another pair 211A and 218A, which are arranged round the rotor to form a predetermined air gap between the rotor and each of them; and a plurality (two in this case) of exciting coils 203 and 212 wound round the stators 201 and 211 each of which is one of each pair.

The base 201 may be made of, for example, a stainless steel sheet material and is in an approximately arcuate shape suited for installation in an annular void space available within a tubular member carrying such parts as an optical lens system, etc. inside of a lens barrel of a camera or the like.

The stators 202, 204, 211 and 218 are arranged along the arcuate base 201 in pairs across the rotor 217 on two sides thereof. The rotor 217 is pivotally carried at both ends of its shaft part 216 by means of a bearing 205 provided on the base 201 and another bearing which is not shown but is provided on the stator 218.

The pairs of stators shown in FIG. 14A are arranged as follows: A first stator 202 has a first magnetic pole part 202A on its fore end part facing the rotor and a stator block part 202B in the rear end part. A second stator 204 has its rear end part positioned and secured with a screw or the like to the stator block part 202B of the first stator; has a first exciting coil 203 wound round it; and has a second magnetic pole part 204A which is opposed at an angle of about 180 degrees to the first magnetic pole part 202A across the rotor 217. A third stator 211 has its rear end part positioned and secured with a screw or the like to the stator block part (not shown) of a fourth stator 218; has a third magnetic pole part 211A at its fore end part; and has a second exciting coil 212 round it. The fourth stator has its rear end block part (not shown) positioned and secured with a screw or the like to the surface of the base 201; and has a fourth magnetic pole part 218A formed in its fore end part and is opposed at an angle of about 180 degrees to the third magnetic pole part 211A across the rotor 217.

In the embodiment, as mentioned above, the stator block part of one (202 or 218) of each pair of stators 202 and 204 or 211 and 218 is secured to the rear end part of the other stator 204 or 211. Meanwhile, the fore end part (or the magnetic pole part 204A or 211A) of the other stator 204 or 211 is arranged to be a free end keeping a gap away from the rotor 217. These free ends are arranged to permit accurate position adjustment relative to the rotor 217.

Means for effecting the above stated position adjustment is arranged as follows: Referring to FIG. 14A, in each pair of stators 202 and 204 or 211 and 218, one stator 202 or 218 carries a stator guide 223 or 224 having a pin 221 or 222 for adjusting the position of the free end of the other stator 204 or 211.

Figure 14B:
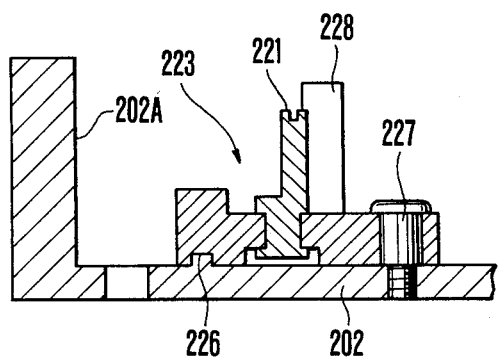
Figure 14C:
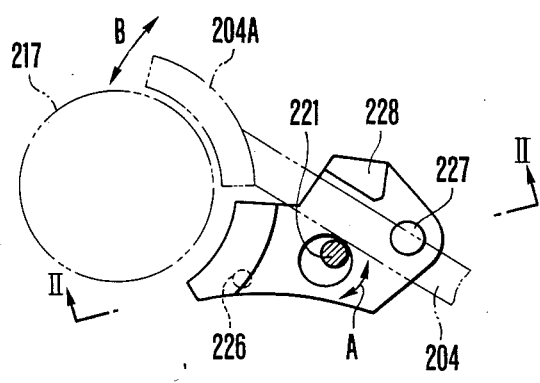

The stator guide 223 having the pin 221 and the other stator guide 224 having the pin 222 are positioned to face inward toward each other and are arranged substantially in the same manner as each other to position adjustably carry and guide the free ends of the counterpart stators 204 and 211. The details of arrangement of the stator guide 223 are as described below while the details of the other stator guide 224 which is likewise arranged are omitted from the description:

FIG. 14B shows the stator guide 223 in a longitudinal sectional view taken along a line II-II of FIG. 14C, which shows it in a plan view. Referring to FIGS. 14B and 14C, while the first stator 202 is secured to the base 201, the stator guide 223 is positioned and secured to the first stator 202 by means of a screw 227 and a positioning projection 226 provided near to the fore end part 202A of the first stator 202.

The stator guide 223 has an eccentric pin 221 which is arranged to have its position adjustable in the circumferential direction and to abut on the other stator 204 to permit adjustment of the position of the fore end pole part (feed end) 204A of the stator 204 relative to the rotor 217. The stator guide 223 is further provided with an extension part 228 which is disposed at a given distance from the eccentric pin and extends in the same direction as the latter. The stator 204 is thus arranged to be guided between the pin 221 and the extension part 228.

In using the stator guide for position adjustment, the position of the free end of the stator 204 which is in contact with the eccentric pin 221 is adjustable in the direction of arrow B by adjusting and turning round the pin 221 in the direction of arrow A. By this, the air gap between the rotor 217 and the free end of the stator 204 can be easily and accurately adjusted.

The other stator guide 224 of FIG. 14A is also arranged likewise to permit easy and accurate adjustment of the air gap between the rotor 217 and the free end (or the magnetic pole part) 211A of the stator 211 which comes in between an eccentric pin 222 and an extension part 229.

Figure 14D:
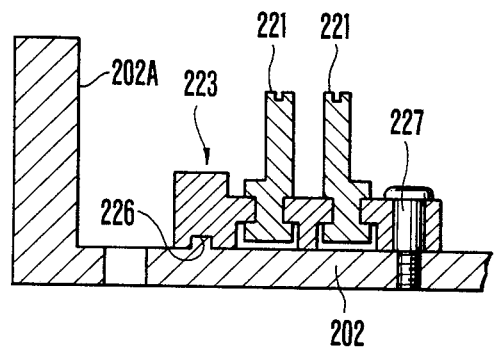
Figure 14E:
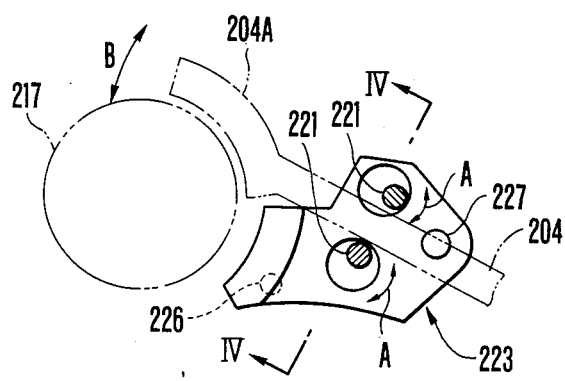

FIGS. 14D and 14E show another example of arrangement of the above stated stator guide 223, FIG. 14D showing it in a longitudinal sectional view taken on a line IV—IV of FIG. 14E, which shows it in a plan view. In the case of this example, the extension part 228 of FIGS. 14B and 14C is replaced with an eccentric pin 221 which is arranged to have a position adjusting function like the above stated eccentric pin 221 of FIGS. 14B. With the exception of this, the rest of this example is substantially identical with the example shown in FIGS. 14B and 14C. Therefore, the parts of FIGS. 14D and 14E are indicated by the same reference numerals as the corresponding parts of FIGS. 14B and 14C and the details of them are omitted from the following description:

The embodiment shown in FIGS. 14D and 14E thus has the position adjusting eccentric pins 221 on two sides of the stator 204. This arrangement permits use of one of the two eccentric pins 221 whichever is more suitable in adjusting the position of the fore free end 204A of the stator 204. The embodiment, therefore, furthers the advantage of the position adjusting function of the arrangement shown in FIGS. 14D and 14C.

Figure 14F:
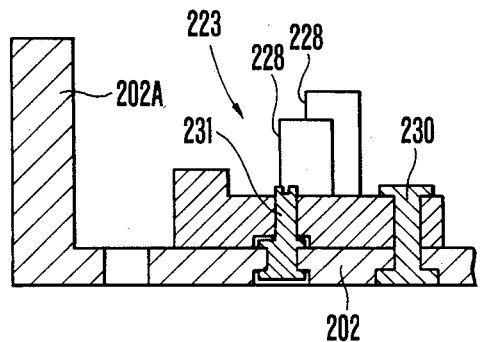
Figure 14G:
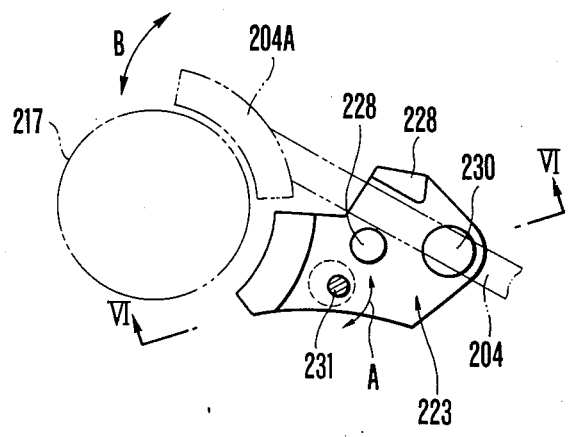

FIGS. 14F and 14G show a still further example of arrangement of the stator guide 223, FIG. 14F showing it in a longitudinal sectional view taken along a line VI—VI of FIG. 14G, which shows it in a plan view. In this instance, the stator guide 223 is provided with two extension parts 228 which are spaced a given distance. The stator guide 223 is pivotally carried by the stator 202 to be turnable on a shaft 230 in the direction of arrow C. Between the stator guide 223 and the stator 202 is provided an eccentric pin 231 for position adjustment. The turning position of the stator guide 223 in the direction of arrow C can be changed by changing the turning position of the eccentric pin 231 in the direction of arrow D. By changing the position of the stator guide 223 in this manner, the position of one of the above stated extension parts 228 which is in contact with the free end (the magnetic pole part) 204 of the stator 204 in the direction of arrow C can be changed to adjust as desired the air gap, i.e. the position of the free end magnetic pole part 204 of the stator 204 relative to the rotor 217. The rest of this example are also virtually the same as the corresponding parts of FIGS. 14B to 14E as shown by the same reference numerals and, therefore, the details of them are omitted from the description given here.

The arrangement shown in FIGS. 14F and 14G gives the same advantageous effect as the example shown in FIGS. 14B and 14C. The position of the free end 204A of the stator 204 relative to the rotor 217 thus can be easily and accurately adjusted.

The motor embodying this invention as described above is of the kind having a plurality of pairs of stators arranged round the rotor which is mode of a permanent magnet and an exciting coil wound round at least one of each pair of stators. In the embodiment, one of each pair of stators has the rear end part of the other stator fixedly attached thereto. The fore end part of the other stator is arranged to be a free end which is arranged to keep a gap away from the rotor. Meanwhile, position adjusting means is provided for adjusting the position of the free end. The embodiment the provides the motor with a stator carrying arrangement which permits easy and accurate adjustment of the position of the stators relative to the rotor.

Figure 15A:
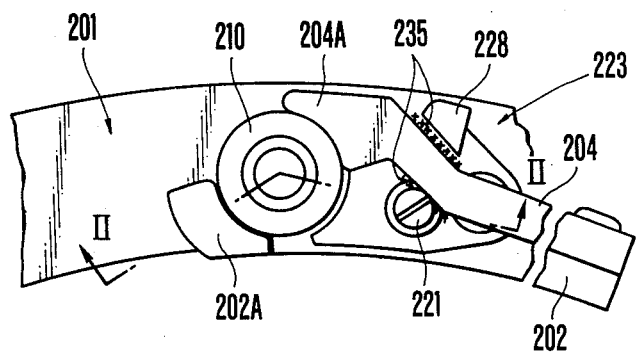
FIGS. 15A and 15B show a manner in which the stators are adjusted, FIG. 15A showing the motor as in a stator carrying arrangement mounting state and FIG. 15B showing the same in a longitudinal section taken along line II—II of FIG. 15A.
Figure 15B:
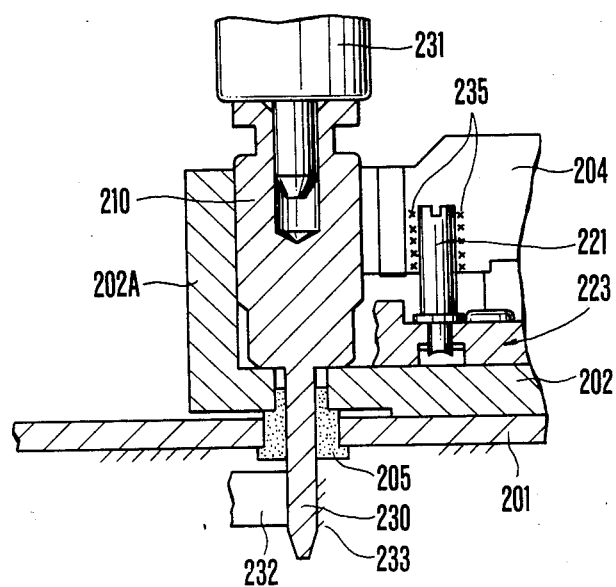

FIGS. 15A and 15B show an improvement on the motor related to this invention. I each of the examples of embodiment of this invention described in the foregoing, each of the stators is formed in an oblong shape according to the shape of the base; each pair of stators are fixedly interconnected in their rear ends. The fore end parts of them are opposed to the rotor across a given air gap respectively. In the case of a compact motor of the kind having such a narrow width, it is necessary to precisely obtain the air gap between the rotor and each stator and to have the stators reliably fixed in place to prevent any occurrence of displacement and deformation of them after they are positioned.

However, in the case of the narrow motor proposed in the past as mentioned in the foregoing, the air gap round the rotor is arranged to be precisely defined on the basis of the part manufacturing precision of the stators despite of a long length between the rear end conjunction parts of the paired stators and the for end part (the air gap forming part) of each stator. This arrangement of the prior art, therefore, has required an extremely high degree of part manufacturing precision and a high degree of rigidity against deformation for the stators. This has resulted in a very high cost.

Whereas, the motor of this embodiment which has a plurality of stators arranged round the permanent magnet rotor with an exciting coil wound round at least one of each pair of stators solves that problem in the following manner. The stator guide which guides one of the paired stators at a part thereof close to its fore end part is secured either to the other of the paired stator or to the base of the motor; the stator guide is provided with an extension part extending along said one of the paired stators; and the extension part is fixed to said one of the paired stators by means of an adhesive The motor of this embodiment is arranged in the same manner as the arrangement shown in FIG. 14A. Therefore, further details of this embodiment are described below with reference to FIGS. 14A, 15A and 15B:

In the case of FIG. 14A, extension parts 221 and 222 are arranged to be the eccentric pins which are rotatably attached to the stator guides 223 and 224. Other extension parts 228 and 229 are arranged to be the projections formed in one body with the stator guides 223 and 224. The extension parts 221 and 228 are disposed in pair on two sides of the stator 204 and serves as positioning guide members to be used in assembling the stator 204. Another pair of extension parts 222 and 229 are also arranged on two sides of the stator 211 to serve as positioning guide members for the stator.

Since the extension parts 221 and 222 are in the form of eccentric pins, the positions relative to the rotor 217 of the free fore ends 204A and 211A of the stators 204 and 211 which are in contact with the extension parts, i.e. the air gap, can be adjusted by turning them.

The extension parts 221 and 228 which guide the stator 204 are secured to the stator 204 and the extension parts 222 and 229 which guide the stator 211 to the stator 211 by means of an adhesive respectively.

FIG. 15A which is a plan view and FIG. 15B which is a longitudinal section show the above stated stator guide 223 as in a state of positioning and fixing the stator 204. The other stator guide 224 is arranged to position the stator 211 virtually in the same manner as the stator guide 223 thought its direction of positioning arrangement differs from the latter. In the following detailed description, therefore, the stator guide 223 is alone taken up by omitting the stator guide 224:

Again referring to FIGS. 15A and 15B, the first stator 202 is first positioned and secured to the surface of the base 201 by utilizing the outward protruding part of a bearing 205 which is secured to the base 201.

After that, a dummy rotor 210 is mounted as positioning jig and has its diameter larger than that of the rotor 217 by as much as the width of the air gap. The shaft part 230 of the dummy rotor 210 is fitted into a bearing 205 at one end thereof. A centering tool 231 is fitted into a center hole provided in the other end of the dummy rotor. A protrudent part of the shaft part 230 is then brought into contact with a positioning vertical face 233 by means of a clamp pin 232. The dummy rotor 210 thus can be correctly positioned in a correct posture.

Following this, the stator 204 which is paired with the stator 202 is fixed to the stator block part 202B of the stator 202 at its rear end part. Then, the stator 204 is positioned by pushing the fore end part (or magnetic pole part) 204A against the circumferential face of the dummy rotor 210. During the process of positioning, the position of the free end 204A of the stator 204 can be accurately adjusted by guiding and adjusting the position of the stator 204 with the extension parts 221 and 228 of the stator guide 223. Upon completion of the position adjustment of the stator 204, spaces in between the stator 204 and the extension parts 221 and 228 are fixedly joined together by an adhesive 235.

The other pair of stators 211 and 218 are likewise positioned and fixed by means of the extension parts 222 and 228 and the adhesive 235. After completion of the positioning and fixing work on the stators 202, 204, 211 and 218, the real rotor 217 is mounted by removing the dummy rotor 210. In the case of the structural arrangement of the embodiment described, the same advantageous effect is attainable by fixing the stator guide 223 directly to the base 201.

As obvious from the description given above, the arrangement of this embodiment to have the stator guide fixed either to one of each pair of stators or to the base in such a position as to guide the other stator on its part near to its fore end; to provide the stator guide with the extension part extending along the other stator; and to fixedly join the extension part and the other stator together by means of an adhesive provide the motor with a stator carrying structural arrangement which permits each of the stators to be easily and reliably fixed in its correct position.

FIGS. 16A to 16D show an improvement over the foregoing example of embodiment of this invention.

In the compact motor of the above stated kind, unequal spacing intervals among stators decrease the number of stably stoppable points of the motor and tend to result in an inaccurate stopping position due to cogging torque. Then, in case where the motor is used for focus adjustment by shifting the above stated focus lens, the minimum control width as reduced to an image plane might become too large for an automatic focusing operation.

Figure 16A:
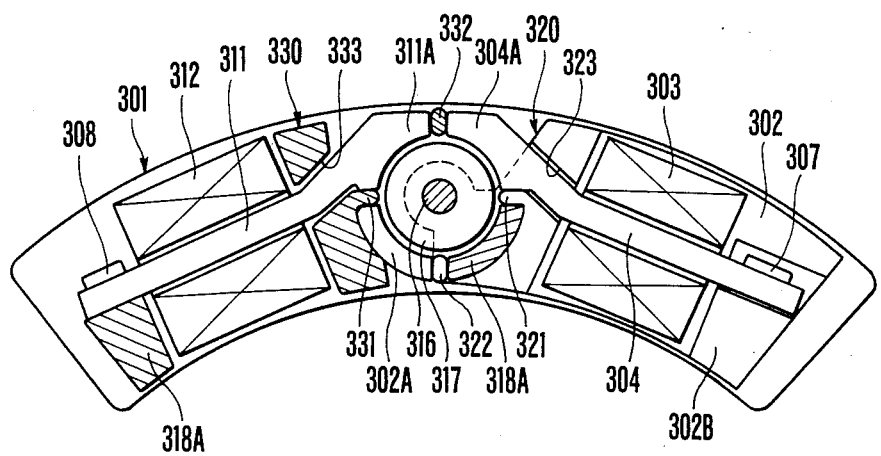
Figure 16C:
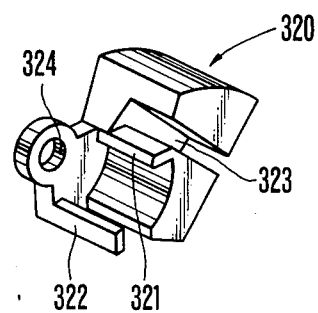
Figure 16B:
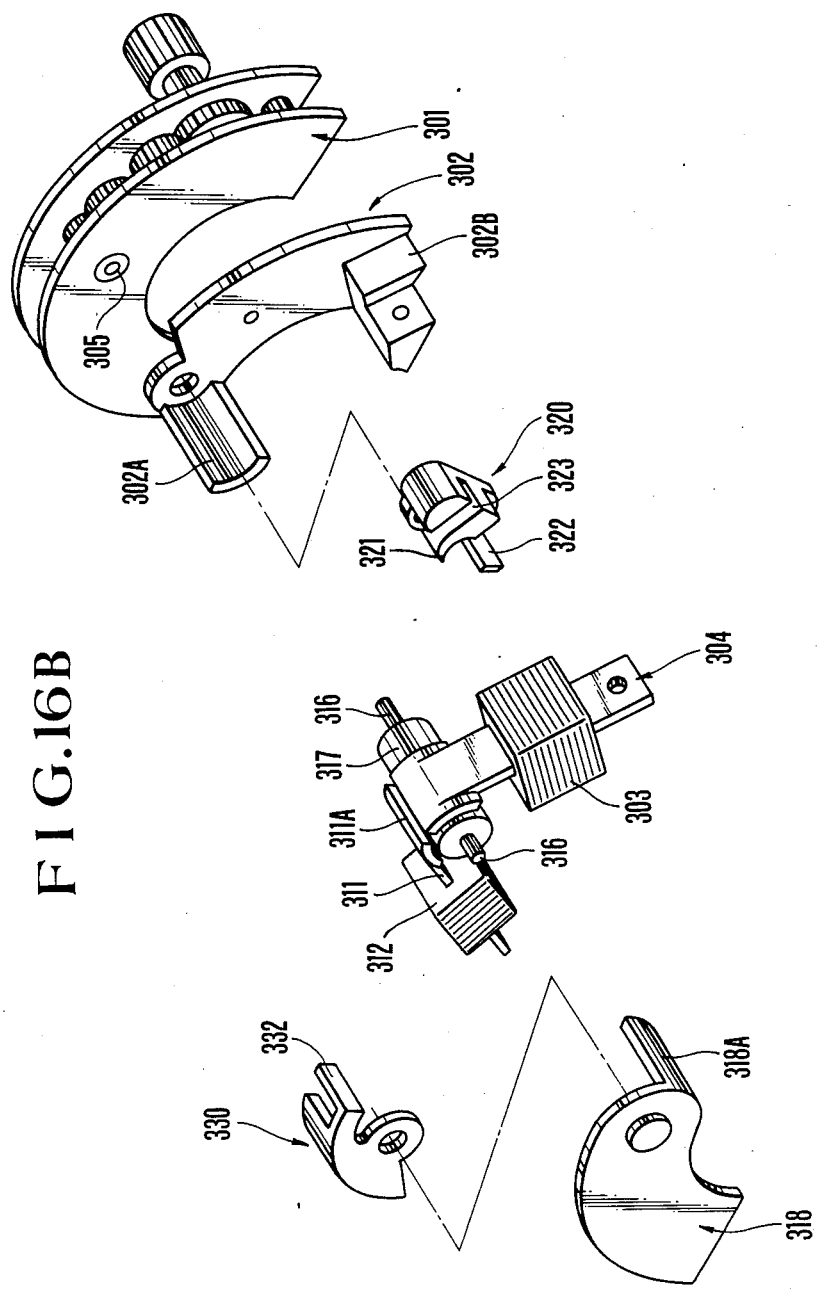

In the motor of this embodiment having plural pairs of stators arranged round a permanent magnet rotor with an exciting coil wound round at least one of each pairs of stators, a stator guide is provided for guiding one of the paired stators on its part close to its fore end; and the stator guide is provided with an extension part which is inserted in between adjacent stators in such a way as to restrict and define a space between the stators. This effectively solves the above stated problem FIG. 16A show in a partly cutaway plan view the motor having the stator carrying device arranged as this embodiment. FIG. 16B shows the motor in an exploded oblique view. The motor comprises a base 301 which is approximately in an arcuate shape; a rotor 317 which is rotatably carried by the base 301; a plurality of pairs (two pairs in this case) of stators made of a magnetic material, including a pair of stators 302 and 304 and another pair 301 and 318; and a plurality (two in this case) of exciting coils 303 and 312 which are wound round one of each pair of stators, i.e. the stators 302 and 311.

Each of the stators is provided with a magnetic pole part 302A, 304A, 311A or 318A which is arranged to form a predetermined air gap round the rotor 317.

The base 301 may be made, for example, from a stainless steel sheet material. The base is in an approximately arcuate shape which is suited for placing it within an annular void space available within a tubular member which is arranged, for example, within a lens barrel of a camera to have such parts as an optical lens system, etc. mounted thereon. The pair of stators 302 and 304 and the other pair 311 and 318 are arranged along the base 301 across the rotor 317. The rotor 317 is rotatably carried by a bearing 305 disposed on the base 301 and another bearing provided on the stator 318 through its two shaft parts 316.

The first stator 302 is in this case positioned and fixed to the base 301. The stator 302 has a first magnetic pole part 302A at its fore end part facing the rotor 317 and a stator block part 302B formed in its rear end part. The second stator 304 has its rear end part secured to the stator block part of the first stator 302 by means of a screw 307 or the like. The stator 304 further has a first exciting coil 308 wound round its intermediate part. A second magnetic pole part 304A is arranged at the fore end part of the second stator 304 to confront the first magnetic pole part 302A across the rotor 317 at a phase angle of about 180 degrees The third stator 311 has its rear end part secured with a screw 308 or the like to the stator block part 318B of the fourth stator 318 which is paired with the stator 311. The stator 311 further has a third magnetic pole part 311A at its fore end part and a second exciting coil 312 wound round its intermediate part. The fourth stator 318 is positioned and fixed to the surface of the base 301 at its rear end block part 318B by means of a screw 318 or the like. The stator 318 has a fourth magnetic pole part 318A arranged at its fore end part to confront the third magnetic pole part 311A across the rotor 317 at a phase angle of about 180 degrees As mentioned in the foregoing, the stator 304 or 311 which is one of each pair of stators 302 and 304 or 311 and 318 is arranged to have a part thereof close to its fore end guided and carried by a stator guide 320 or 330 which is secured to the other stator 302 or 318.

Each of the stator guides 320 and 330 has extension parts 321 and 331 or 331 and 332 inserted in between adjacent stators among the stators 302, 304, 311 and 318 or, in other words, between adjacent magnetic pole parts. These extension parts thus define the circumferential positions of the magnetic pole parts 302A, 304A, 311A and 318A. The stator guide 320 which is secured to the first stator 302 and the stator guide 330 which is secured to the fourth stator 318 are, as shown in FIG. 16B, attached to these stators on their inner sides facing the inside of the motor. These guides have virtually the same structural arrangement and function in respect of that both of them guide the counterpart stators 304 and 311 and that each of the extension parts 321, 322, 331 and 332 are inserted in between adjacent magnetic pole parts. Therefore, the details of only the stator guide 320 are mainly described below FIG. 16C shows in an oblique view the stator guide 320. The stator guide 320 includes a groove 323 which is arranged to guide a part of the counterpart stator 304 located close to its free fore end part 304A; a hole 324 which is arranged to have the shaft 316 of the rotor 317 inserted therethrough; and the above stated extension parts 321 and 322. This stator guide 320 is prepared, for example, by molding a plastic material.

As shown in FIG. 16A, the extension part 321 is inserted in between the second magnetic pole part 304A and the fourth magnetic pole part 318A. The extension part 322 is inserted in between the fourth pole part 318A and the first pole part 302A. By virtue of these extension parts, the stators are assembled with precise spacing between them in the circumferential direction of the rotor.

The other stator guide 330 which is positioned and fixed to the fourth stator 318 is likewise provided with a groove which guides a part of the third stator 311 close to the fore end of the third stator and also has the above stated extension parts 331 and 332 formed in one body therewith. The extension part 331 is inserted in between the first and third magnetic pole parts 302A and 311A. The extension part 332 is inserted in between the third and second pole parts 311A and 304A. The stators are therefore precisely spaced in the circumferential direction by virtue of these inserted extension parts.

Further, the stator guide 330 is also provided with a hole (not shown) which is arranged to have a portion of the shaft 316 of the rotor 317 on the side opposite to the side shown in FIG. 16A.

In the motor of the embodiment having the plural pairs of stators 302, 304, 311 and 318 arranged round the rotor 317, as described above, the stator guides 320 and 330 are arranged to guide the fore end parts of the stators 304 and 311 each of which is one of the paired stators; these stator guides are provided with extension parts 321, 322, 331 and 332 each of which is inserted in between adjacent stators; and the circumferential positions of the stators are defined by these extension parts. This arrangement not only facilitates accurate spacing of the stators in the circumferential direction (equal spacing in general) but also ensures durability of their precise positions. The embodiment thus solves the problems of deviation from a correct stopping point and an increase in the minimum controllable angle mentioned in the foregoing.

When the coils 303 and 312 of the motor are excited in rotation, the torque is generated at intervals precisely corresponding to a set angle. Therefore, the torque ripple decreases to give smooth rotation. The embodiment not only enhances the reliability of the motor but also lowers noises due to vibrations.

FIG. 16D shows in a graph a torque characteristic resulting from phase variations obtained in the case of a two-phase motor. Referring to FIG. 16D, a graph (A) shows the characteristic obtained when two pairs of magnetic poles are precisely positioned at circumferential intervals of 90 degrees, i.e. when the phase difference between first and second phases is precisely 90 degrees. A one-dot-chain line indicates a torque obtained at the first phase. A broken line indicates a torque obtained at the second phase. A full line indicates the output of the motor (a sum of the first and second phases).

A graph (B) shows the torque characteristic obtained when the difference between phases deviates about 30 degrees from 90 degrees while the Hall element which detects the rotating position of the rotor 317 is in a correct position relative to the stator in each phase.

A graph (C) shows the torque characteristic obtained when the difference between phases deviates about 30 degrees from 90 degrees while the Hall element alone remains in its correct position for the phase difference of 90 degrees.

The stator guides 320 and 330 of this embodiment permits accurate setting of the phase difference for each phase (at 90 degrees in this instance) as the spacing intervals between adjacent magnetic pole parts are precisely defined by virtue of the extension parts 321, 322, 331 and 332. Therefore, as obvious from these graphs (A), (B) and (C), the embodiment gives a uniform torque characteristic as shown in the graph (A), so that the torque ripple can be lessened.

In this specific embodiment, the stator guides 320 and 330 are fixed in position on the stators 302 and 318 respectively. However, this invention can be practised by positioning and securing them to the base 301.

Since each stator guide has its extension parts inserted in between adjacent stators to restrict and define the space between these stators, the embodiment permits the stators to be accurately positioned in the circumferential direction of the rotor despite of its simple structural arrangement. The embodiment, therefore, permits accurate position control over the motor and also gives smooth rotation of the motor by reducing the torque ripple as described in the foregoing.

What is claimed is:

1. A motor comprising:
   a rotor including a two pole permanent magnet and a rotating shaft;
   a stator including:
   a first pair of yokes comprising a first yoke member having a bearing part at one end and rotatably supporting one end of the rotating shaft and also having at said one end a first magnetic pole part which extends along an outer circumference of said rotor, and a second yoke member which is provided at one end with a second magnetic pole part arranged to face said first magnetic pole part from across said rotor, said second yoke member also being provided with a first exciting coil would thereon:
   a second pair of yokes comprising a third yoke member having a third magnetic pole part which extends along an outer circumference of said rotor and a fourth yoke member provided at one end thereof with a fourth magnetic pole part arranged to face said third magnetic pole part from across said rotor, said fourth yoke member also being provided with a second exciting coil wound thereon; and
   a position detecting element constructed and arranged to detect the magnetic poles of said rotor and to generate a coil power supply reversing signal,
   said position detecting element being mounted on a circuit board having a circuit for supplying power to said coil and a circuit for said position detecting element.

2. A motor comprising:
   a rotor comprising a permanent magnet and a rotating shaft;
   a stator including:
   a first pair of yokes comprising a first yoke member having a bearing part at one end and rotatably supporting one end of the rotating shaft and also having at said one end a first magnetic pole part which extends along an outer circumference of said rotor, and a second yoke member which is provided at one end with a second magnetic pole part arranged to face said first magnetic pole part from across said rotor, said second yoke member also being provided with a first exciting coil wound thereon;

a second pair of yokes comprising a third yoke member having a third magnetic pole part which extends along an outer circumference of said rotor and a fourth yoke member provided at one end thereof with a fourth magnetic pole part arranged to face said third magnetic pole part from across said rotor, said fourth yoke member also being provided with a second exciting coil wound thereon;

a Hall element arranged to detect the magnetic poles of said rotor and generating a coil power supply changing signal, being mounted on a circuit board having a circuit for supplying power to said coil;

a shielding member for shielding magnetic fluxes generated from said magnetic pole parts, said shielding member being fixed to said yoke members and being so formed to cover said Hall element for shielding magnetic fluxes generated from the magnetic pole parts.

3. A motor comprising:
a rotor comprising a rotating shaft;
a stator including:

a first pair of yokes comprising a first yoke member having a bearing part at one end and rotatably supporting one end of the rotating shaft and also having at said one end a first magnetic pole part which extends along an outer circumference of said rotor, and a second yoke member which is provided at one end with a second magnetic pole part arranged to face said first magnetic pole part from across said rotor, said second yoke member also being provided with a first exciting coil wound thereon:

a second pair of yokes comprising a third yoke member having a third magnetic pole part which extends along an outer circumference of said rotor and a fourth yoke member provided at one end thereof with a fourth magnetic pole part arranged to face said third magnetic pole part from across said rotor, said fourth yoke member also being provided with a second exciting coil wound thereon;

a Hall element arranged to detect the magnetic poles of said rotor and to generate a coil power supply changing signal;

means for cancelling the magnetic fluxes introduced into said Hall element from said magnetic pole parts, said cancelling means including a flux cancelling coil and an iron core member having said cancelling coil wound thereon;

said cancelling coil being connected to one of said exciting coils and said Hall element being disposed close to said cancelling means.

* * * * *

UNITED STATES PATENT AND TRADEMARK OFFICE
CERTIFICATE OF CORRECTION

PATENT NO. : 4,806,813
DATED : February 21, 1989
INVENTOR(S) : AKIYASU SUMI ET AL.          Page 1 of 5

It is certified that error appears in the above-identified patent and that said Letters Patent is hereby corrected as shown below:

ON THE TITLE PAGE,

AT [56] REFERENCES CITED

Foreign Patent Documents, "18423 9/1985 Japan" should read --184234 9/1985 Japan--.

FIGURE 16A

"318A" (bottom left of drawing) should read --318B--.

COLUMN 1

Line 35, "pencil shaped" should read --pencil-shaped--.

COLUMN 3

Line 15, "detecting" should read --showing the detecting--.
    Line 27, "an" (second occurrence) should read --a--.
    Line 57, "THR" should read --THE--.

UNITED STATES PATENT AND TRADEMARK OFFICE
CERTIFICATE OF CORRECTION

PATENT NO. : 4,806,813
DATED : February 21, 1989
INVENTOR(S) : AKIYASU SUMI ET AL.

It is certified that error appears in the above-identified patent and that said Letters Patent is hereby corrected as shown below:

COLUMN 5

Line 9, "yokes members 32 and 34" should read --yokes 32 and 34--.
Line 26, "bent up" should read --bent-up--.
Line 29, "(or in" should read --shape--.
Line 30, "a not shown ring like shape) shape" should read --(or in a not shown ring-like shape)--.
Line 48, "38A" should read --34A--.
Line 55, "rotor 36" should read --rotor 36.--.
Line 56, "yoke members the" should read --yoke members 32A and 32B and the--.
Line 57, "yoke members 32 and 34 and another pair" should read --yoke members 34A and 34B--.
Line 58, "of yokes 34A and 34B" should be deleted.
Line 62, "yokes 32A and 34A" should read --yokes 32 and 34--.
Line 64, "base plate 30" should read --yokes 32 and 34--.

COLUMN 6

Line 35, "The S pole of the rotor 36," should read --the S pole (or N pole) of the rotor 36,--.
Line 36, "output" should read --output voltages--.
Line 38, "come 46a>46b." should read --comes 46a>46b.--.

COLUMN 7

Line 15, "stator 34a3" should read --stator pole part 34a3--.
Line 24, "the" (first occurrence) should read --a--.
Line 38, "become" should read --becomes--.

UNITED STATES PATENT AND TRADEMARK OFFICE
CERTIFICATE OF CORRECTION

PATENT NO. : 4,806,813
DATED : February 21, 1989
INVENTOR(S) : AKIYASU SUMI ET AL.          Page 3 of 5

It is certified that error appears in the above-identified patent and that said Letters Patent is hereby corrected as shown below:

COLUMN 8

Line 24, "ad" should read --and--.

COLUMN 9

Line 6, "stator coil" should read --stator coil 38A--.
    Line 48, "Hall element 46" should read
           --Hall elements 46--.
    Line 58, "with" should read --when--.

COLUMN 11

Line 16, "rotor.  This" should read --rotor, this--.
    Line 20, "is" should read --are--.
    Line 25, "to." should read --too.--.

COLUMN 12

Line 62, "of" (second occurrence) should be deleted.

COLUMN 13

Line 5, "he" should read --the--.
    Line 15, "process" should read --process.--.
    Line 23, "magnet" should read --magnet.--.
    Line 42, "201" should read --204--.

COLUMN 14

Line 2, "round" should read --wound round--.

UNITED STATES PATENT AND TRADEMARK OFFICE
CERTIFICATE OF CORRECTION

PATENT NO. : 4,806,813
DATED : February 21, 1989
INVENTOR(S) : AKIYASU SUMI ET AL.        Page 4 of 5

It is certified that error appears in the above-identified patent and that said Letters Patent is hereby corrected as shown below:

COLUMN 15

Line 4, "14B." should read --14B and 14C.--.
    Line 18, "14D" should read --14B--.
    Line 35, "(the magnetic pole part) 204" should read
          --(the magnetic pole part) 204A--.
    Line 38, "pole part 204" should read --pole part 204A--.
    Line 51, "mode" should read --made--.
    Line 64, "I" should read --In--.

COLUMN 16

Line 12, "of" should be deleted.
    Line 13, "for" should read --fore--.
    Line 59, "thought" should read --though--.

COLUMN 17

Line 62, "show" should read --shows--.

COLUMN 18

Line 2, "another pair 301 and 318;" should read
         --another pair 311 and 318;--.
    Line 40, "318" should be deleted.
    Line 51, "parts 321 and 331 or 331 and 332" should read
         --parts 321 and 322 or 331 and 332--.

COLUMN 20

Line 9, "permits" should read --permit--.
    Line 25, "of" (second occurrence) should be deleted.

UNITED STATES PATENT AND TRADEMARK OFFICE
CERTIFICATE OF CORRECTION

PATENT NO. : 4,806,813
DATED : February 21, 1989
INVENTOR(S) : AKIYASU SUMI ET AL.

Page 5 of 5

It is certified that error appears in the above-identified patent and that said Letters Patent is hereby corrected as shown below:

COLUMN 22

Line 26, "a flux" should read --a magnetic flux--.

Signed and Sealed this

Third Day of September, 1991

Attest:

HARRY F. MANBECK, JR.

*Attesting Officer*     *Commissioner of Patents and Trademarks*